US012403886B2

(12) United States Patent
Books et al.

(10) Patent No.: US 12,403,886 B2
(45) Date of Patent: Sep. 2, 2025

(54) ELECTRIC DRIVE VEHICLE WITH ANTI-ROLLBACK CONTROL

(71) Applicant: Cummins Inc., Columbus, IN (US)

(72) Inventors: Martin T. Books, Columbus, IN (US); Odaro Omusi, Columbus, IN (US); Jack Schneider, Columbus, IN (US); Richard A. Booth, Columbus, IN (US); Jaime A. Lugo-Castillo, Columbus, IN (US); Quresh Sutarwala, Fremont, CA (US)

(73) Assignee: CUMMINS INC., Columbus, IN (US)

( * ) Notice: Subject to any disclaimer, the term of this patent is extended or adjusted under 35 U.S.C. 154(b) by 27 days.

(21) Appl. No.: 17/779,495

(22) PCT Filed: Sep. 21, 2020

(86) PCT No.: PCT/US2020/051731
§ 371 (c)(1),
(2) Date: May 24, 2022

(87) PCT Pub. No.: WO2021/108012
PCT Pub. Date: Jun. 3, 2021

(65) Prior Publication Data
US 2024/0166188 A1 May 23, 2024

Related U.S. Application Data

(60) Provisional application No. 62/942,031, filed on Nov. 29, 2019.

(51) Int. Cl.
B60W 10/08 (2006.01)
B60W 10/02 (2006.01)
(Continued)

(52) U.S. Cl.
CPC .......... *B60W 10/024* (2020.02); *B60W 10/08* (2013.01); *B60W 10/18* (2013.01);
(Continued)

(58) Field of Classification Search
CPC .... B60W 10/024; B60W 10/08; B60W 10/18; B60W 30/1886; B60W 2050/0024; B60W 2510/083; B60W 2720/24
See application file for complete search history.

(56) References Cited

U.S. PATENT DOCUMENTS

| 6,679,810 | B1 * | 1/2004 | Boll ...................... F16D 48/068 |
| | | | 477/194 |
| 9,002,547 | B2 | 4/2015 | Matthews, Jr. et al. |

(Continued)

FOREIGN PATENT DOCUMENTS

| CN | 1486881 A | 4/2004 |
| CN | 102019924 A | 4/2011 |

(Continued)

OTHER PUBLICATIONS

International Search Report and Written Opinion for International patent application No. PCT/US2020/051731, filed Sep. 21, 2020, mailed Feb. 10, 2021.

*Primary Examiner* — Stephen Holwerda
(74) *Attorney, Agent, or Firm* — Faegre Drinker Biddle & Reath LLP

(57) ABSTRACT

A method of reducing rollback of a electric vehicle, including determining a position baseline of the electric vehicle; determining a position compensated speed of the electric vehicle based on the position baseline; determining a hold torque as a function of the position compensated speed; and generating a command to apply the hold torque to the motor-generator of the electric vehicle.

20 Claims, 18 Drawing Sheets

(51) Int. Cl.
*B60W 10/18* (2012.01)
*B60W 30/18* (2012.01)
*B60W 30/188* (2012.01)
*B60W 50/00* (2006.01)

(52) U.S. Cl.
CPC . *B60W 30/1886* (2013.01); *B60W 2050/0024* (2013.01); *B60W 2510/083* (2013.01); *B60W 2720/24* (2013.01)

(56) References Cited

U.S. PATENT DOCUMENTS

| | | | |
|---|---|---|---|
| 9,321,355 B1* | 4/2016 | Shah | B60L 7/18 |
| 10,821,977 B1* | 11/2020 | Stein | B60W 10/08 |
| 2007/0191181 A1* | 8/2007 | Burns | B60W 30/18118 |
| | | | 477/40 |
| 2009/0201013 A1* | 8/2009 | Wang | F16H 59/0204 |
| | | | 324/207.24 |
| 2011/0065548 A1 | 3/2011 | Yu et al. | |
| 2013/0054062 A1* | 2/2013 | Matsushita | B60W 30/1843 |
| | | | 701/22 |
| 2013/0184906 A1* | 7/2013 | Harper | B60L 15/2009 |
| | | | 701/22 |
| 2013/0291830 A1 | 11/2013 | Doering et al. | |
| 2013/0296112 A1* | 11/2013 | Yamazaki | B60W 10/06 |
| | | | 903/902 |
| 2014/0309901 A1* | 10/2014 | Schneider | B60T 8/18 |
| | | | 701/70 |
| 2015/0232092 A1* | 8/2015 | Fairgrieve | B60W 30/18172 |
| | | | 701/93 |
| 2018/0328750 A1 | 11/2018 | Yun et al. | |

FOREIGN PATENT DOCUMENTS

| | | |
|---|---|---|
| CN | 104583031 A | 4/2015 |
| EP | 1393954 B2 | 3/2004 |
| EP | 2885174 B1 | 5/2019 |

* cited by examiner

ELECTRIC DRIVE VEHICLE WITH ANTI-ROLLBACK CONTROL

CROSS-REFERENCE TO RELATED APPLICATIONS

The present application is a national stage and claims the benefit of, and priority from, International Patent Application No. PCT/US2020/051731, filed Sep. 21, 2020, which claims benefit of U.S. Provisional Patent Application No. 62/942,031, filed Nov. 29, 2019, which are incorporated by reference herein in their its entirety.

FIELD OF THE DISCLOSURE

The disclosure relates to vehicles with motor-generators, and more particularly to vehicles powered by motor-generators without torque converters.

BACKGROUND OF THE DISCLOSURE

Conventional vehicles equipped with combustion engines and fully automatic transmissions mitigate rollback when launching from a standstill while on an uphill grade via a torque converter that produces a continuous driveline torque. While inefficient, the continuous driveline torque tends to counter the effects of gravity when launching on a grade.

It is desirable to equip electric drive vehicles with features that provide customers with driveability transparency vis a vis conventional vehicles.

SUMMARY

An electric vehicle, a driveline controller, and a method of reducing rollback of the electric vehicle are provided herein. The method may be implemented by the driveline controller installed in the electric vehicle.

[1] In a first aspect of the disclosure, a method of reducing rollback of an electric vehicle comprises: determining a position baseline of the vehicle; determining a position compensated speed of the vehicle based on the position baseline; determining a hold torque as a function of the position compensated speed; and generating a command for a motor-generator of the vehicle to apply the hold torque.

[2] The method of [1], wherein determining a position baseline comprises determining a stopped condition of the vehicle or a speed polarity transition, wherein the position baseline is a position of the vehicle at a time when the stopped condition or the speed polarity transition were determined.

[3] The method of [2], wherein determining a stopped condition of the vehicle comprises determining that a speed of the vehicle is less than or equal to an absolute zero speed tolerance for a zero speed dwell time.

[4] The method of [1], wherein determining a position compensated speed of the vehicle comprises adding a position baseline component and an attenuated speed component, wherein the attenuated speed component comprises a product of a speed of the vehicle and a speed factor.

[5] The method of [4], wherein the hold torque is based on a product of the position compensated speed and the speed factor.

[6] The method of [1], wherein the hold torque is based on a product of the position compensated speed and a speed factor.

[7] The method of [6], wherein the position compensated speed of the vehicle comprises a sum of a position baseline component and an attenuated speed component, wherein the attenuated speed component comprises a product of a speed of the vehicle and the speed factor.

[8] The method of [7], wherein the hold torque comprises a cancellation rate limit.

[9] The method of [8], wherein the cancellation rate limit decreases as a function of time.

[10] The method of any one of [4]-[9], wherein the speed factor comprises a normalized dwell time based on a brake release event or a speed of the vehicle being less than an absolute zero speed tolerance.

[11] The method of [10], wherein the speed factor ranges between 0 and 1.

[12] The method of [10], wherein the normalized dwell time comprises a ratio of a dwell time based on the brake release event or the speed of the vehicle being less than the absolute zero speed tolerance.

[13] The method of [10], wherein the speed factor decreases if the speed is greater than the absolute zero speed tolerance or if the brakes are reapplied.

[14] The method of any one of [4]-[9], wherein the speed factor is proportional to a dwell time starting when brakes of the vehicle are released or a speed of the vehicle is less than an absolute zero speed tolerance.

[15] The method of [1], further comprising disengaging the hold torque if a speed of the vehicle exceeds a cancellation speed.

[16] The method of [15], wherein disengaging the hold torque comprises reducing the hold torque to zero.

[17] The method of [16], wherein disengaging the hold torque comprises rate limiting a rate at which the hold torque is reduced to zero.

[18] The method of [1], further comprising determining a slope of the vehicle, wherein the hold torque function further includes a slope component comprising the slope and a slope gain.

[19] The method of [1], further comprising determining a mass of the vehicle, wherein the hold torque function further includes a mass component comprising the mass and a mass gain.

[20] The method of [1], further comprising determining a slope and a mass of the vehicle, wherein the hold torque function further includes a component comprising the slope the mass.

[21] The method of [1], further comprising a brake pressure feedback, wherein the hold torque function includes a brake pressure feedback component.

[22] The method of [1], further comprising determining a grade, and determining a mass of the vehicle based on the grade, wherein the hold torque function further includes a mass component based on the mass.

[23] In a second aspect of the disclosure, a controller for vehicle including a motor-generator operable to drive a wheel of the vehicle is provided, the controller comprising processing instructions which when executed implement the method of any one of [1]-[22].

[24] In a third aspect of the disclosure, an electric vehicle is provided, the vehicle comprising: a wheel supporting a frame; a motor-generator operable to drive the wheel; and a controller comprising processing instructions which when executed implement the method of any one of [1] to [22].

[25] The vehicle of [24], further comprising a sensor communicatively coupled with the controller and operable to sense movement of the vehicle.

[26] The vehicle of [24], further comprising a brake pedal and a brake sensor communicatively coupled with the controller and operable to determine pressure applied to the brake pedal.

BRIEF DESCRIPTION OF THE DRAWINGS

The above-mentioned and other disclosed features, the manner of attaining them, and the advantages thereof will become more apparent and will be better understood by reference to the following description of disclosed embodiments taken in conjunction with the accompanying drawings, wherein.

Corresponding reference characters indicate corresponding parts throughout the several views. The exemplification set out herein illustrates embodiments of the invention, and such exemplifications are not to be construed as limiting the scope of the invention in any manner.

DETAILED DESCRIPTION

Figure 1:
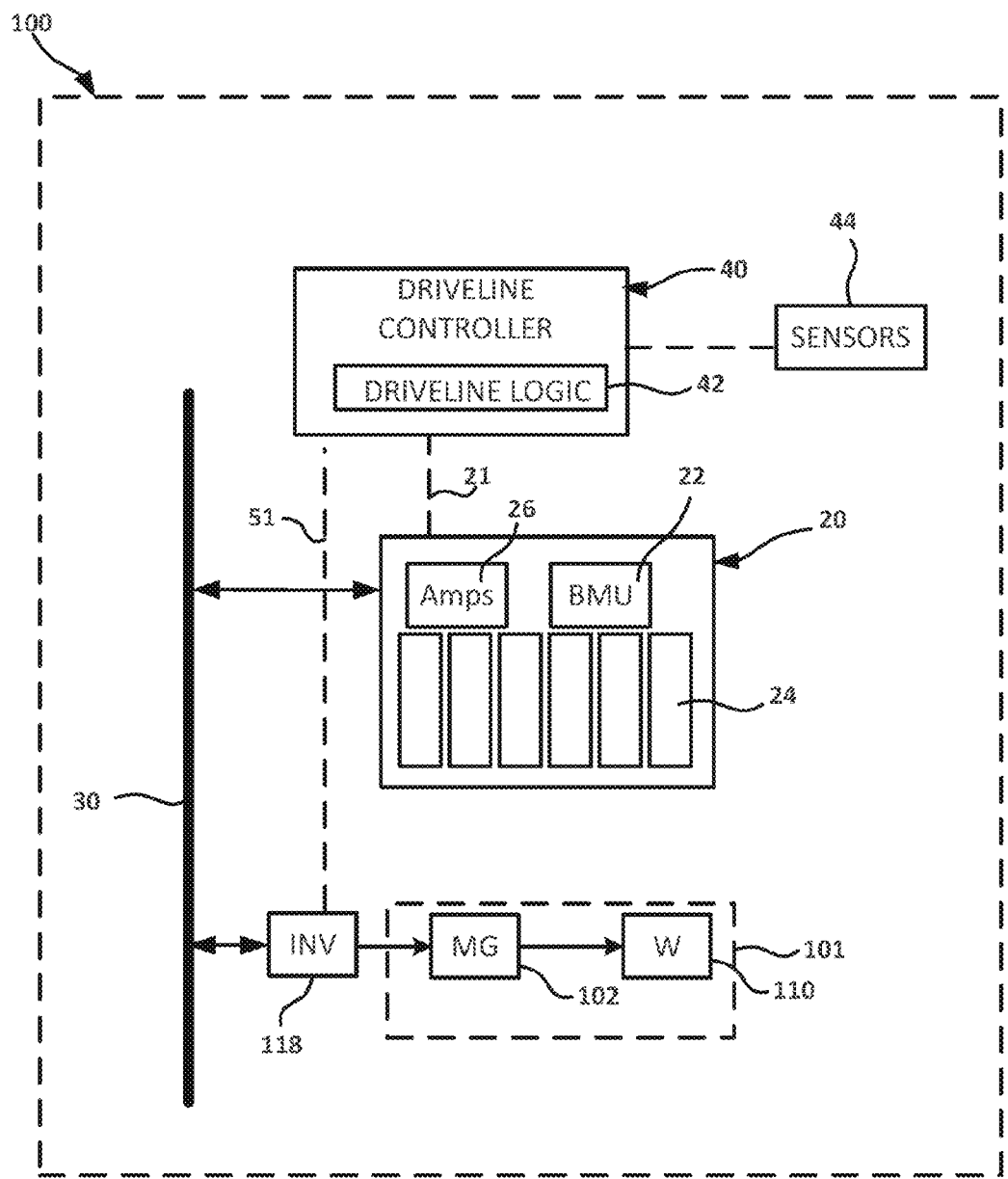
FIG. 1 is a schematic diagram of an electric vehicle.

For the purposes of promoting an understanding of the principles of the invention, reference will now be made to the embodiments illustrated in the drawings, which are described below. The embodiments disclosed below are not intended to be exhaustive or limit the invention to the precise form disclosed in the following detailed description. Rather, the embodiments are chosen and described so that others skilled in the art may utilize their teachings. No limitation of the scope of the invention is intended by the selection of the disclosed embodiments.

As used herein, an electric vehicle comprises a vehicle with an electric motor-generator, or motor. Generally, an electric powertrain or driveline comprises electric motors connected, directly or indirectly, to a traction system. A traction system may comprise wheels, for example. The wheels may drive continuous treads, or tracks, for example. The powertrain may be entirely electric, e.g. an all-electric vehicle, or may include, in addition to the electric motors, a combustion engine, e.g. a hybrid electric vehicle. Thus, hybrid and all-electric vehicles are types of electric vehicles.

Example electric vehicles include automobiles, trucks, forklifts, buses, straddle carriers, reach stackers, empty container handlers, etc. As used herein, the weight of a vehicle comprises the unloaded, or tare, weight as well as the loaded weight. The loaded weight of an electric vehicle can change significantly in use. The weight of a bus changes as passengers embark and disembark. A truck may be configured to removably attach a trailer or a container, thus its loaded weight includes the weight of the trailer or container, which may be empty, partially loaded, or fully loaded. A shipyard truck may weigh 25,000 lbs unloaded and 75,000 lbs loaded, for example, therefore the driveline torque and braking requirements vary significantly between loaded and unloaded states of electric vehicles.

FIG. 1 is a schematic diagram of an electric vehicle 100 comprising an electric traction system 101 including a motor-generator 102 and wheels 110 which may be connected to motor-generator 102 by an axle (not shown) or directly; an inverter 118 operable to generate a motor voltage for motor 102; a battery 20 connected to a bus 30 to power electric traction system 101; and a driveline controller 40. Driveline logic 42 of driveline controller 40, alternatively referred to as processing instructions, establishes communications, as is known in the art, between the driveline controller, the battery, and the inverter, over communication lines 21 and 51. Preferably the communication lines convey digital data between the components. A CAN bus may be implemented to provide the communication lines. The driveline controller monitors sensor signals from sensors 44, performs safety and performance checks, determines faults based thereon, and monitors operator controls, such as a mode selector (e.g. drive/reverse), a brake pedal position, and an accelerator pedal position. Additional sensors and signals are described with reference to FIG. 15. Electric vehicle 100 does not include a torque converter.

Battery 20 may comprise one or more battery packs comprising a battery management unit (BMU) 22 and battery modules 24. BMUs are generally well known. Temperature, voltage, and other sensors may be provided to enable BMU 22 to manage the charging and discharging of battery modules 24 without exceeding their limits, to detect and manage faults, and to perform other known functions. Via the communication line BMU 22 may convey to driveline controller 40 information about the battery, including the battery charge power limit, temperature, faults, etc. Battery 20 may include a current sensor 26 to provide a measured current value to the BMU.

Driveline logic 42 is operable to determine a command for the inverter to supply a motor voltage to motor 102. The motor voltage is configured, as is known in the art, to result in a desired amount of torque generation by motor 102. The desired torque is configured taking into account gear ratios and multiple motors that may be engaged, including varying motor sizes. Driveline controller 40 may include functionality well known in the art of electric vehicles. Such functionality may include functionality for range-extension, regeneration, and torque ratio control if a combustion engine is provided in a hybrid electric vehicle, etc.

It is desirable to equip electric drive vehicles with features that provide customers with driveability transparency vis-a-vis conventional vehicles, including features to counteract rollback motion. Different approaches have been considered based on detected motion, which can be susceptible to various limitations. For example, the response time may be such that the electric drive does not produce sufficient torque in time to prevent noticeable rollback motion. Additionally, the naturally underdamped kinematics of a vehicle driveline may be vulnerable to large, sudden torque applications that can result in driveline speed/torque oscillations. Algorithms based solely on speed to produce counteracting torque tend to produce oscillations based on sudden high-gain reaction. Algorithms based solely on position may tend to overshoot the desired maximum position as they must produce torque to both offset gravity plus the kinetic energy of a vehicle already in motion. Thus, even when the algorithms mitigate driveline speed oscillation, if such oscillation does occur the controller will often "chase" the changing speed with counteracting torque, thereby sustaining the oscillation. The tendency to excite driveline instability also complicates detection of rollback. If negative speed is indicative of rollback, negative speed can also be observed in a sudden stop where measured speed may exhibit underdamped settling at zero, producing several excursions into the negative speed range. The challenge becomes to distinguish negative speed due to rollback from negative speed due to undershoot.

Figure 2:
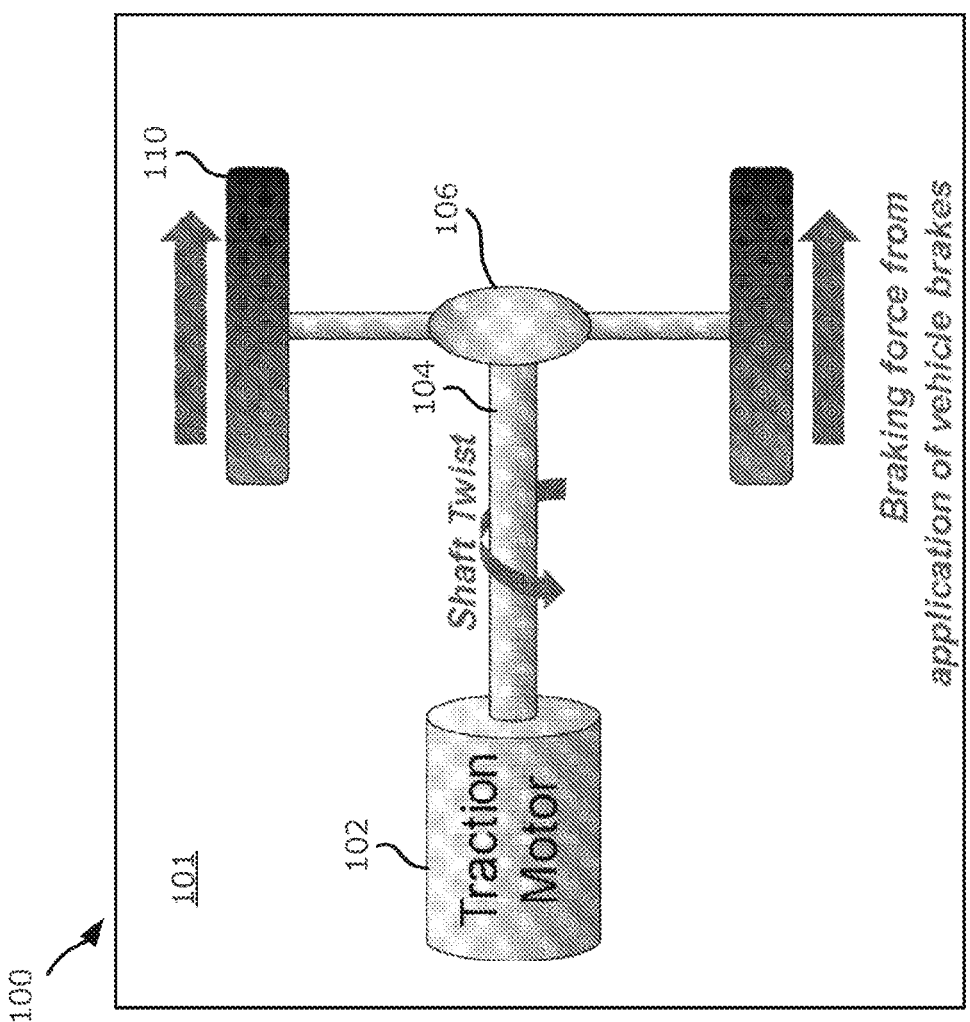
FIG. 2 is a schematic diagram of a driveline of the electric vehicle of FIG. 1, including a traction motor coupled to a driveshaft.

The kinematics of vehicle driveline 101 will now be described with reference to FIG. 2. Driveline 101 comprises traction motor, or motor-generator, 102 connected with a driveshaft 104 to turn a differential 106 connected to drive wheels 110. Torque applied by traction motor 102 twists driveshaft 104. On stopping, driveline oscillation occurs when the potential energy due to twist in the driveshaft is quickly released. If there is little or no energy in the shaft twist, there is no discernable oscillation. The way to differentiate between actual roll-back or undershoot due to oscillation is to recognize the factors that produce twist in the shaft, namely, applying vehicle brakes on a vehicle in motion. If the vehicle has been stopped or brakes have been released for a period of time, any negative speed observed is almost certainly rollback. Rollback control methods described below rely on these characteristics.

Embodiments of a rollback control method will be described hereinbelow with reference to a flowchart 120 depicted in FIG. 3. Generally, the method comprises generating a hold torque based on a position compensated speed and commanding the motor-generator of the vehicle to apply the hold torque to mitigate rollback. The method is particularly advantageous in large vehicles, such as buses and trucks, which require significant hold torque to oppose gravity in terrain that is not flat. The method is even more advantageous in buses because slow response to rollback will require an even larger hold torque, which can noticeably affect passengers when the hold torque is applied.

Figure 3:
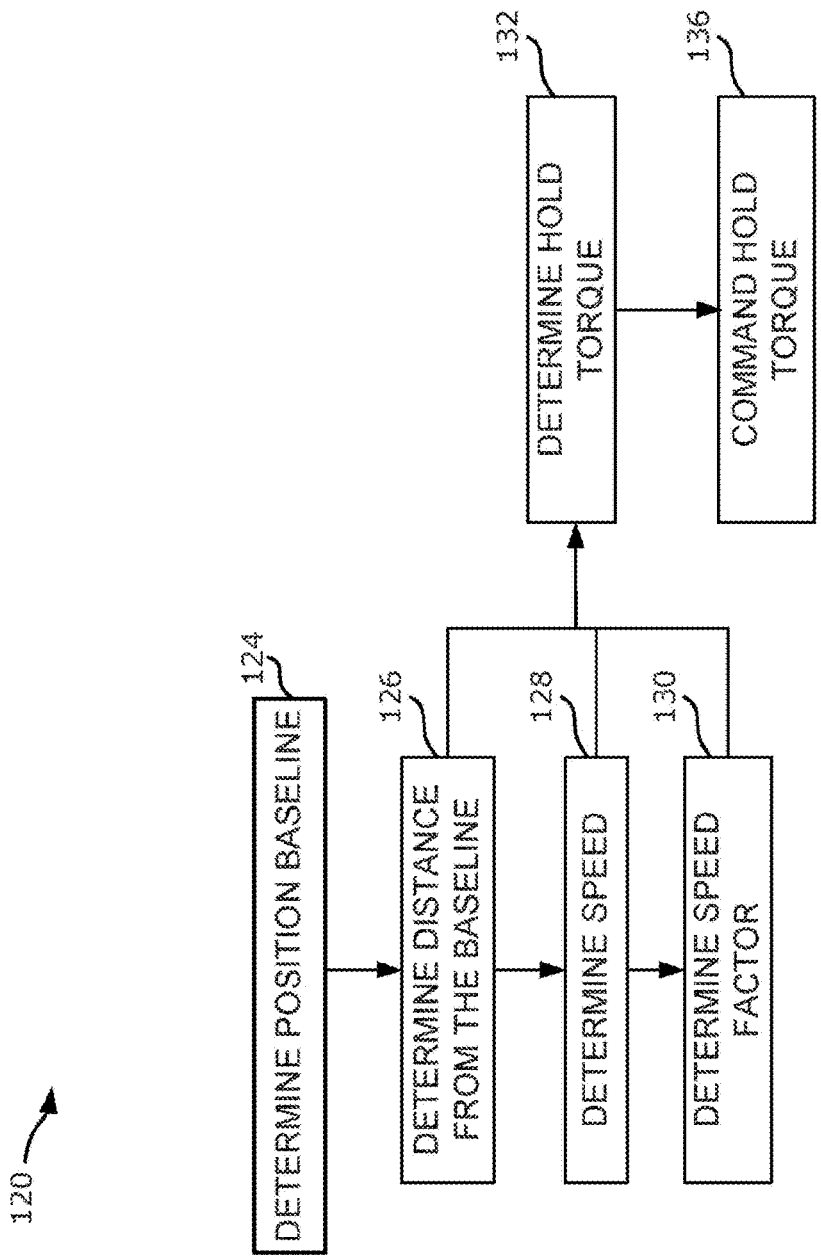
FIG. 3 is a flowchart of an embodiment of a rollback control method.

Still referring to FIG. 3, the method begins with determining a position baseline of the vehicle, at 124. Determining a position baseline may comprise determining a stopped condition of the vehicle or a speed polarity transition, wherein the position baseline is a position of the vehicle at a time when the stopped condition or the speed polarity transition were determined. The speed polarity transition is an indication of an instantaneous stopped condition. In other words, in a positive grade, when the vehicle stops moving forward it stops for a very brief amount of time before it begins moving backward. The position baseline can be determined in relation to an angular position of a flywheel or gear or other component of the driveline of the vehicle. The position baseline serves to determine distance from the baseline.

Determining a stopped condition of the vehicle may comprise determining that a speed of the vehicle is less than or equal to an absolute zero speed tolerance for a zero speed dwell time. The absolute zero speed tolerance defines a range about a zero speed. The vehicle is in the stopped condition if the vehicle's speed is within the range.

The method continues, at 126, with determining a distance from the baseline. If the baseline position is determined from an angular position of a rotary component, the distance can be calculated by tracking the movement of the rotary component since the time when the baseline position was determined.

At 128, the speed of the vehicle is determined. The speed can be determined from the angular position or from other sensors that indicate speed. Angular position may be sensed by sensing gear teeth or other detectable features in a rotating component, accounting for reduction ratios. The same sensors can be used to determine speed, by counting the signals sensed during a period of time.

At 130, a speed factor is determined. The speed factor will be used to attenuate the speed in inverse proportion to an indication of torsional potential energy in the driveshaft. In one example, the time since the brakes were released or the vehicle remains stopped can be used to determine the speed factor.

The speed factor may comprise a normalized dwell time based on the stopped condition. The speed factor may be normalized to a range between 0 and 1, where 0 represents full attenuation and 1 represents no attenuation. The speed factor may decrease if the speed is greater than the absolute zero speed tolerance or if the brakes are reapplied.

At 132, the hold torque is determined. The hold torque is determined taking into account the distance, the speed, and the speed factor. The product of the speed and the speed factor can be referred to as the attenuated speed. The sum of components representative of the attenuated speed and the distance can be referred to as the position compensated speed. A table or map relating the position compensated speed to torque can be used to determine the hold torque from the position compensated speed. In a variation of the present embodiment, the speed factor is omitted. A plurality of tables may be used instead of using a speed factor to account for torsional potential energy. It should be understood that the speed, speed factor, and distance parameters can be determined in any order or concurrently.

At 136, a hold torque command is determined. The hold torque command is determined based on the value of the hold torque. A cancelation rate limit may be applied to limit the rate at which the hold torque is reduced to zero when the application of hold torque is canceled. Cancelation may be due to the application of brakes or change to a different drive mode.

The hold torque may be disengaged if the speed of the vehicle exceeds a disengagement speed or the drive mode is switched, for example. Disengaging the hold torque may comprise reducing the hold torque to zero. The rate at which the hold torque is reduced to zero may be limited.

In some embodiments, the grade of the terrain is determined and the hold torque is generated based on position compensated speed and grade. The grade represents the slope of the terrain on which the vehicle is located and can be obtained from terrain maps and a GPS location or from a grade sensor positioned in the vehicle that indicates a relationship of the vehicle to a vertical or horizontal axis. Example grade sensors include accelerometers, inertia, incline, and gravity sensors. A six-axis inertial sensor may be used as a grade sensor. Inertial sensors can be purchased in microelectronic mechanical systems (MEMS) integrated circuits. An accelerometer can be used to determine acceleration. Accelerometers can also be purchased in MEMS integrated circuits. MEMS integrated circuits generally contain circuits to convert mechanical movement to an analog or digital voltage output representative of the movement. Acceleration can also be obtained from the driveline control unit or other on-board systems. A grade component of the hold torque can be determined in anticipation of the amount of rollback based on the grade, to improve rollback control even more. Alternatively, if the power/acceleration ratio of the vehicle is tracked over time, an indication of the mass is provided by the power/acceleration ratio and based on the mass the grade can be obtained as the vehicle travels.

In some embodiments, a mass of the vehicle is determined and the hold torque includes a component representative of the mass. The mass of the vehicle can be determined by monitoring power and acceleration over time, wherein power is related to the product of mass and acceleration. An indication of the mass of the vehicle can be characterized from measurement of various power levels and acceleration levels obtained during operation of the vehicle. The ratio of power/acceleration when the vehicle is loaded compared to when it is empty will indicate the mass due to the load. Other methods to determine mass from performance parameters of the vehicle are known and may be used here. Mass may be determined substantially continuously to account for changes in weight due to, for example, boarding and unboarding of passengers.

In some embodiments, the grade of the terrain and the mass of the vehicle are determined and the hold torque is generated based on position compensated speed, grade, and mass. The grade and mass components are determined in anticipation of the amount of rollback based on the grade and mass, to improve rollback control even more, as described in the preceding paragraphs.

Another aspect of the disclosure comprises a driveline controller for a vehicle including a motor-generator operable to drive a wheel of the vehicle. The driveline controller comprises processing instructions which when executed implement the method described above with reference to FIG. 3 and variations thereof.

Another aspect of the disclosure comprises an electric vehicle including wheels powered by a motor-generator. The electric vehicle includes a driveline controller communicatively coupled with various sensors and outputs hold torque commands which are implemented with an inverter to provide power to the motor-generator to generate the commanded torque. The sensors may include speed, motion, braking, brake pedal, slope or grade, and any other sensor operable to determine position and speed of the vehicle, and optionally one or more of mass and grade.

The electric vehicle may also comprises a brake pedal and a brake sensor communicatively coupled with the driveline controller and operable to determine with the brake sensor a desired amount of braking (e.g. pedal position). The desired amount of braking, for example to bring a vehicle to a stop from a slow speed, can be used to determine mass and grade.

The electric vehicle may also comprise an accelerator pedal and an accelerator sensor communicatively coupled with the driveline controller and operable to determine with the accelerator sensor a desired amount of acceleration based on the pedal position. The desired amount of acceleration can be used to determine a desired amount of torque (positive or negative) in a "single pedal" function. Thus, when the pedal is depressed, positive acceleration and torque are desired, and when the pedal is released, negative acceleration and torque are desired, even if the brake pedal is not actuated. This gives the driver the ability to control the speed of the vehicle with a single pedal.

An embodiment of an algorithm to implement a rollback control method will now be described with reference to FIGS. 4-14. The algorithm uses a proportional-plus-derivative control based on a combination of position and speed to schedule a reactive torque. Position alone will produce reactive torque that will counter movement, with permitted movement being a function of grade and vehicle mass but will tend to undershoot as torque must offset movement plus vehicle momentum. Addition of a speed component accounts for momentum. The speed component intervenes earlier with torque to stop the vehicle, plus torque to hold the vehicle. Position is measured from a baseline sampled position. The baseline position may be sampled when the vehicle has been stopped for a period of time or the vehicle's speed transitions from positive to negative.

The algorithm disables reactive torque when it is likely that the cause of negative speed is oscillation rather than rollback. It should be understood that while the foregoing and other examples are described with reference to a vehicle wanting to drive forward but tending to roll backward due to gravity on an uphill grade, the same principles apply to a vehicle wanting to drive in reverse but tending to roll forward due to gravity on a downhill grade.

The algorithm determines conditions that indicate a probability of underdamped driveline speed oscillation. If there is a high likelihood of oscillating behavior, the algorithm diminishes or disables the speed element of the reactive torque determination, because negative speed cannot be distinguished from undershoot. If there is a low likelihood of oscillating behavior, then the algorithm uses full speed influence in determining reactive torque. The algorithm may ramp a gain component as a way of transitioning gracefully between the above two conditions. Then, using position and an adjusted speed element from above, the algorithm determines a proper reactive torque to prevent or mitigate vehicle roll-back.

In controller terms, this equates to using position feedback with lead-compensation. The algorithm allows an unconstrained torque increase in response to the detected rollback. A rate limit is applied on the torque return-to-zero as a way of interrupting the natural sinusoid in speed that an underdamped oscillation will produce.

A Simulink simulation to implement the algorithm, depicted in FIGS. 4-14, will now be described. As is known in the art, a Simulink simulation can generate executable processing instructions for a controller. The controller generates commands for a motor-generator to implement the desired hill hold torque. Various logic sequences will be described in detail below to illustrate the operation of the logic symbols in the Simulink simulator software. Subsequent figures will be described in terms of their function only, except when further clarification might facilitate understanding.

Figure 4:
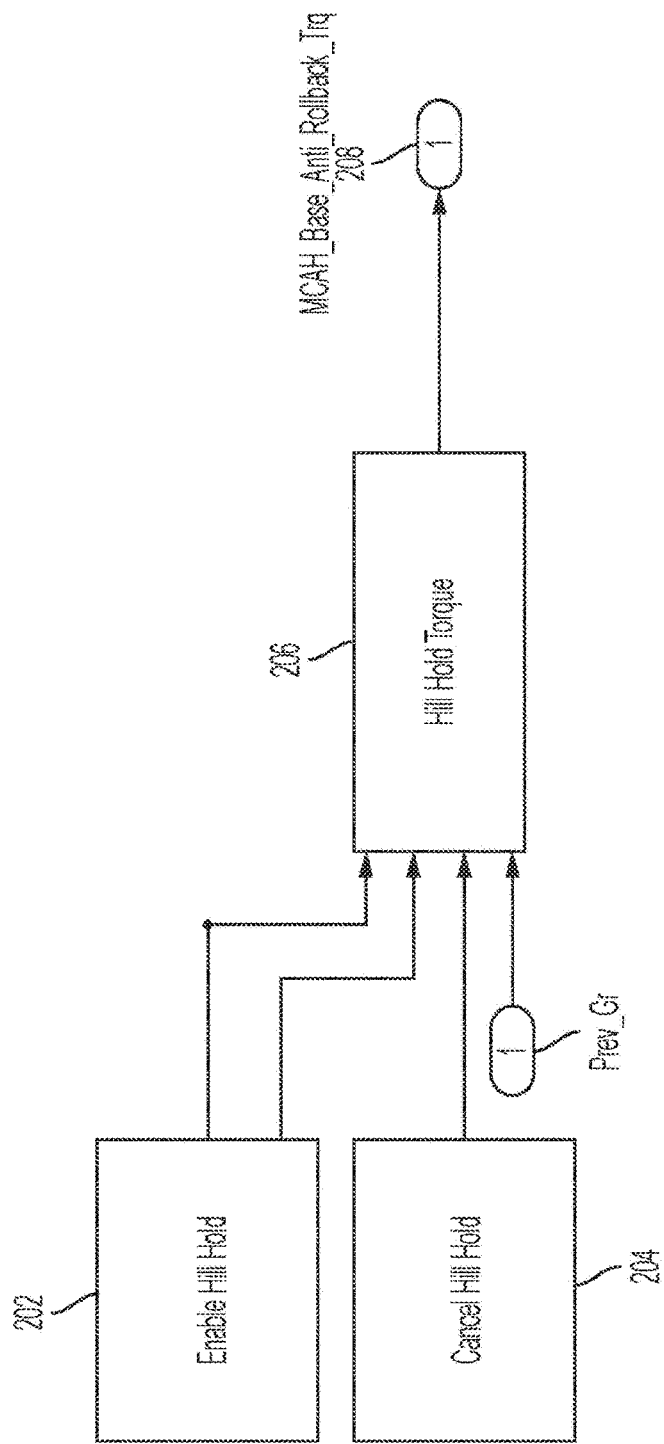
FIGS. 4-14 are, collectively, a Simulink simulation representing an embodiment of a rollback control method.

Referring to FIG. 4, generally, the simulation comprises block 202, enable hill hold, block 204, cancel hill hold, and 206, hill hold torque ("HHT"). Hill hold is also referred to as anti-rollback. Enable hill hold is a function that determines when conditions for enabling the HHT are satisfied and is described with reference to logic block 220 in FIG. 5. FIG. 6 depicts a function that disables hill hold torque. Cancel hill hold is a function that determines when conditions for cancelling the HHT are satisfied and is described with reference to FIG. 7. Hill hold torque is a function that determines the HHT and is described with reference to FIGS. 8-14. While disabling HHT prevents generation of the HHT, cancellation of the HHT implicates the reduction from a generated HHT to zero.

The speed element of the anti-rollback function is attenuated based on the likelihood that the negative speed is really due to oscillations instead of being actual rollback. The indicators of this will be the brake pedal activity and speed. Oscillation is caused by applying traction motor torque at one end of the drivetrain of a moving vehicle and an opposing force at the other end with the brakes. If the brakes are applied or have recently been applied, while moving, then there is significant likelihood that negative speed is an undershoot. But if the brakes are not applied or the vehicle initially is stationary, then negative speed is more likely indicative of actual rollback. The speed attenuation factor is calculated based on time since brakes were released or the vehicle stopped. The time is a count-up/count-down timer with no reset.

Figure 5:
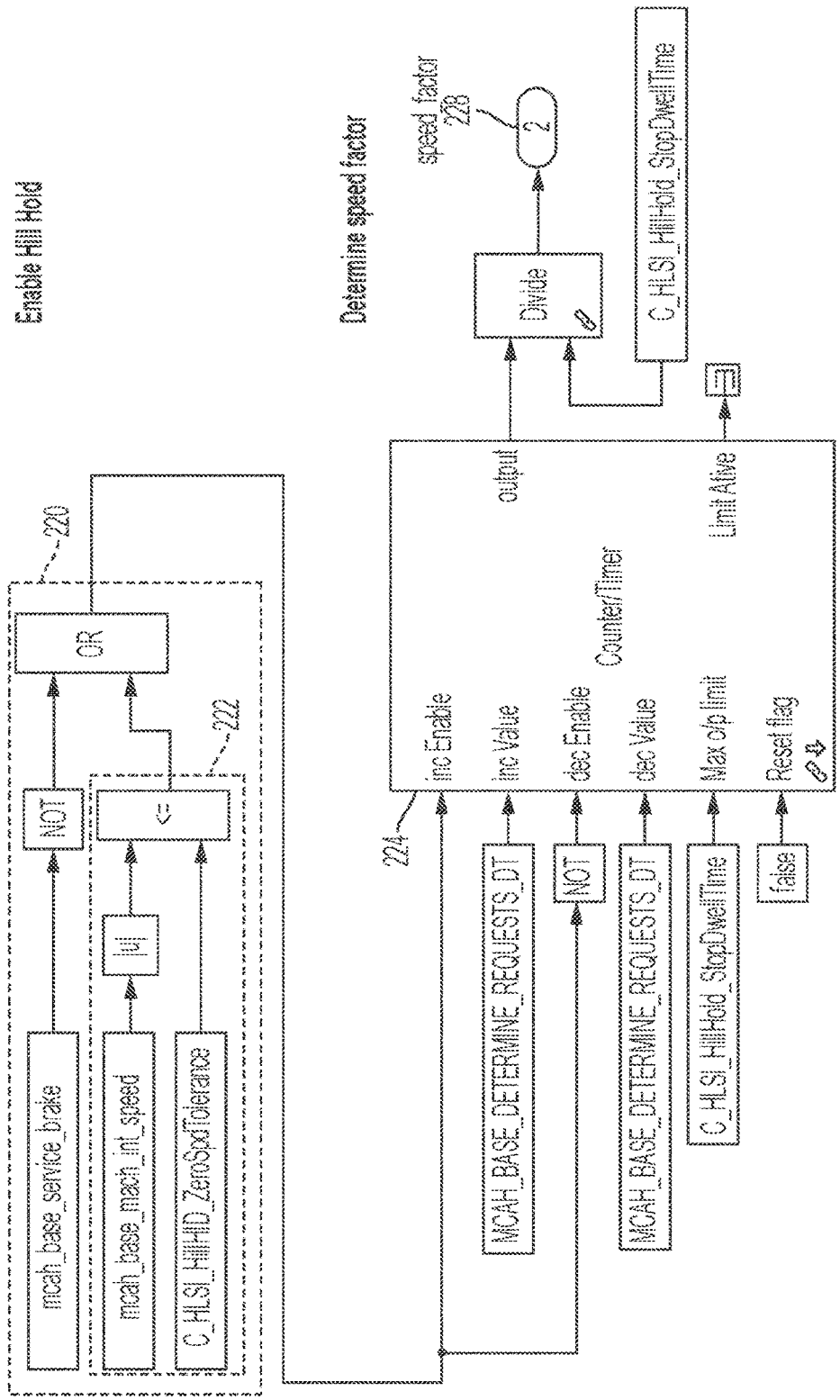
Figure 6:
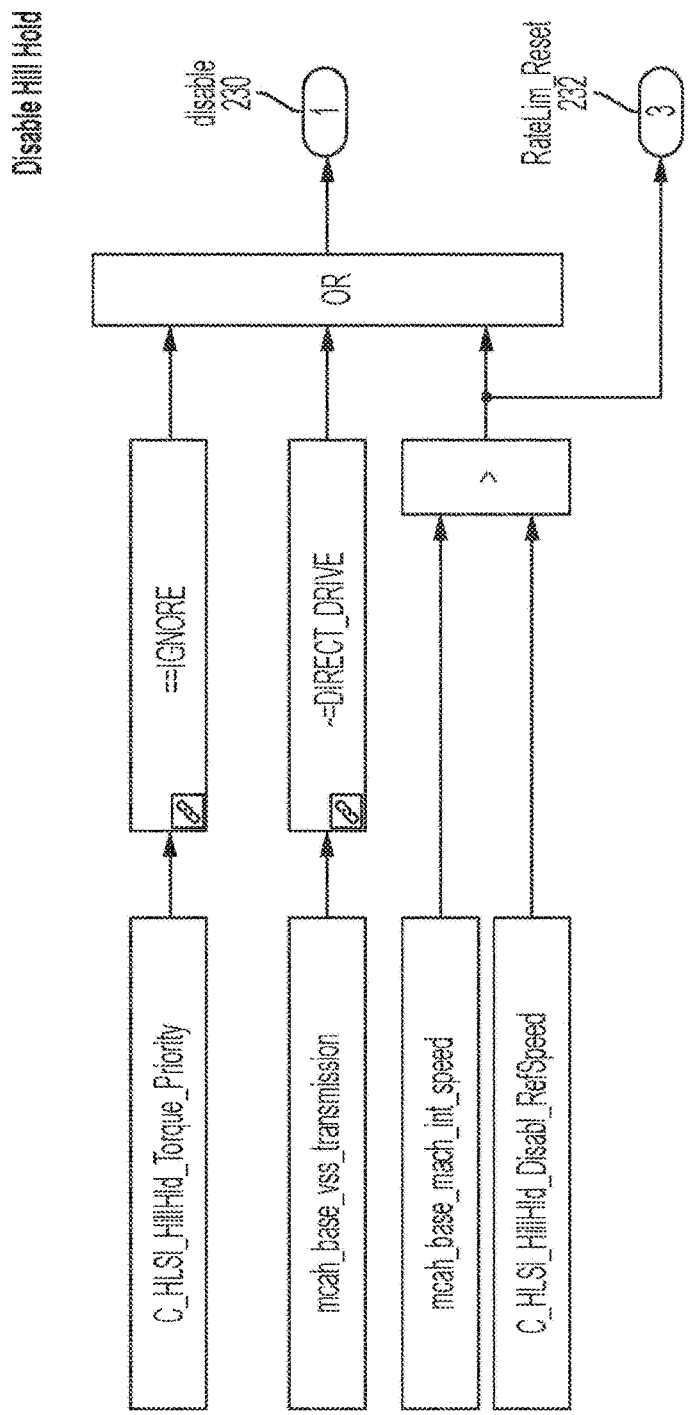

Referring to FIG. 5, the enable hill hold function includes hill hold enable logic 220 and logic configured to determine the speed factor, or speed attenuation factor, 228. A dwell timer 224 increases and decreases. It increases when hill hold enable logic 220 is true, which occurs when the brakes are released or during a stopped condition of the vehicle determined by stopped vehicle logic 222. The mcah_base_service_brake parameter is provided by a brake sensor that indicates when the brakes are on. The output of the "not" block indicates when the brakes have been released, e.g. not "on". The output of stopped vehicle logic 222 is true when the absolute speed of the vehicle is less than or equal to a zero speed tolerance. The mcah_base_mach_int_speed parameter indicates speed. The C_HLSI_HillHld_ZeroSpd-Tolerance parameter indicates how much speed is acceptable to still be considered zero speed. Thus, the speed sensing system may have some variation, and the zero speed tolerance determines when the variation is small enough to be immaterial. When either logic sequence is true, an "or" block outputs a signal that enables dwell timer 224 to increase. If the "or" output is false, dwell timer 224 is enabled to decrease.

Speed factor 228 is normalized by a maximum dwell time, which is the maximum output of dwell timer 224, so that the output of the timer ranges from 0 to the maximum dwell time. The output is divided by maximum dwell time, and the speed factor thus ranges between 0-1.

Referring to FIG. 6, the disable hill hold function depicts logic configured to disable the HHT. The hill hold torque is disabled if the functionality is (1) turned off, (2) the vehicle is not in a direct drive mode, or (2) speed is out of a range (high) for rollback to be a concern.

The C_HLSI_HillHld_Torque_Priority parameter indicates whether the hill hold torque function is turned on or off. If C_HLSI_HillHld_Torque_Priority is set to IGNORE, then the hill hold torque function is disabled. In the figures, the symbol "~=" represents boolean "not" and the symbol "==" represent boolean "yes". C_HLSI_HillHld_Torque_Priority may be determined by a switch operable by an operator of the vehicle.

The mcah_base_vss_transmission parameter indicates which drive mode the vehicle is set to. If mcah_base_vss_transmission is not set to DIRECT_DRIVE, then the hill hold torque function can be disabled. The mcah_base_vss_transmission parameter may be determined by a transmission mode selection switch operable by an operator of the vehicle.

The mcah_base_mach_int_speed parameter is provided by a sensor to indicate speed. The C_HLSI_HillHld_Disabl_RefSpeed parameter indicates the reference speed at which the hill hold torque function can be disabled, which is a speed fast enough to signify that rollback is not likely. Thus, if mcah_base_mach_int_speed is greater than C_HLSI_HillHld_Disabl_RefSpeed, then the hill hold torque function can be disabled. If any of the three logic sequences input to the "or" logic block is true, the HHT disable function outputs a disable signal 230.

A rate limit reset signal 232 is output to disable a torque rate limit once the vehicle's speed is above the vehicle's reference speed.

Figure 7:
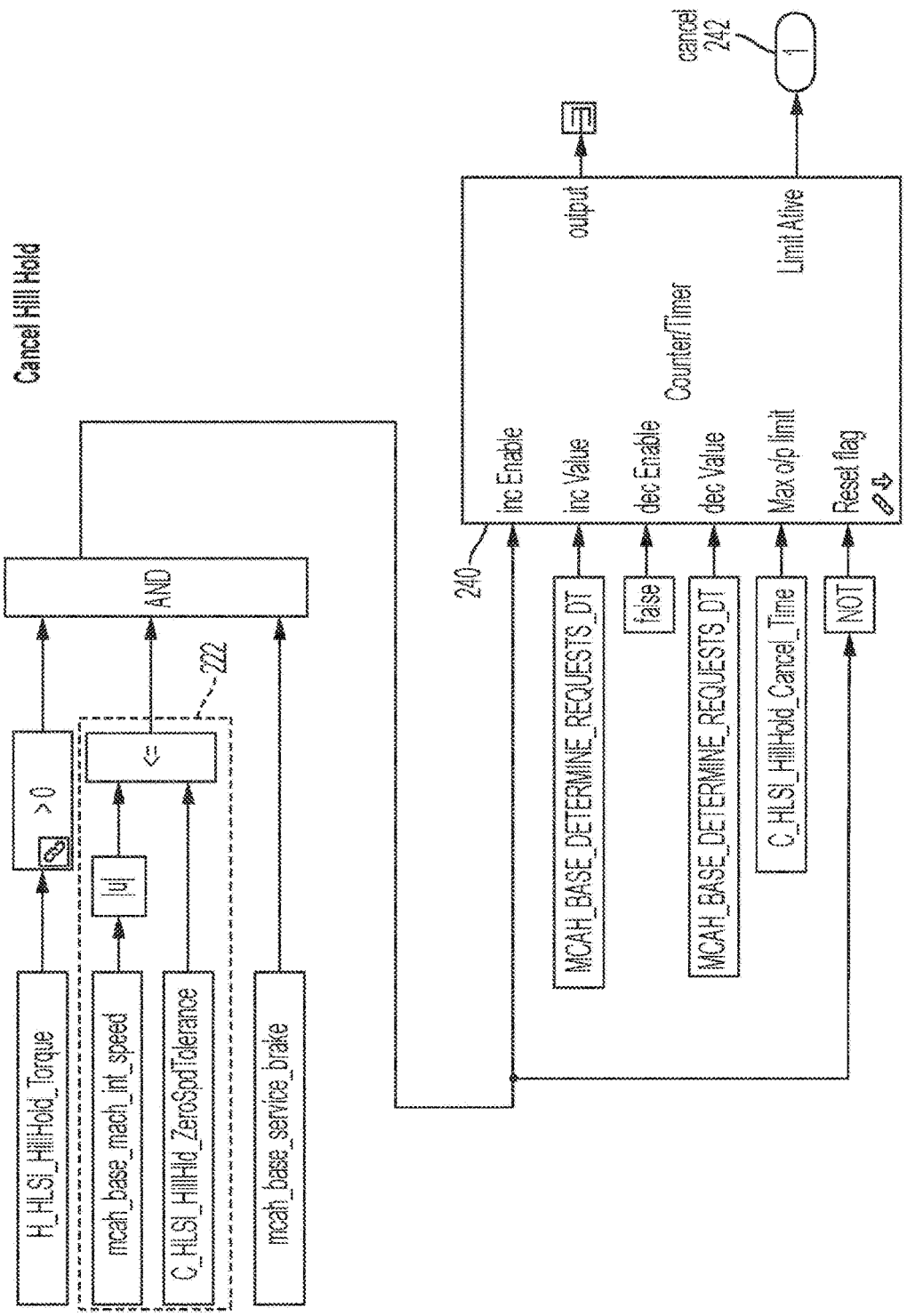

Referring to FIG. 7, the cancel hill hold function depicts logic configured to cancel the HHT when it is not needed, which may occur, for example, when rollback stopped and the brake is re-applied. It is not necessary to use battery power to stop the vehicle if the brakes are applied. When HHT is canceled, the applied HHT is ramped down to zero. A HHT cancel timer 240 is incremented when certain conditions are satisfied. The conditions are satisfied when the holding torque is greater than zero, stopped vehicle logic 222 is true, and the brake has been applied. If the conditions are satisfied, the "and" logic block is true, which enables incrementation of HHT cancel timer 240, up to a C_HLSI_HillHold_Cancel_Time limit. The HHT cancel logic outputs a true HHT cancel signal 242 when HHT cancel timer 240 times out at the C_HLSI_HillHold_Cancel_Time limit.

Figure 8:
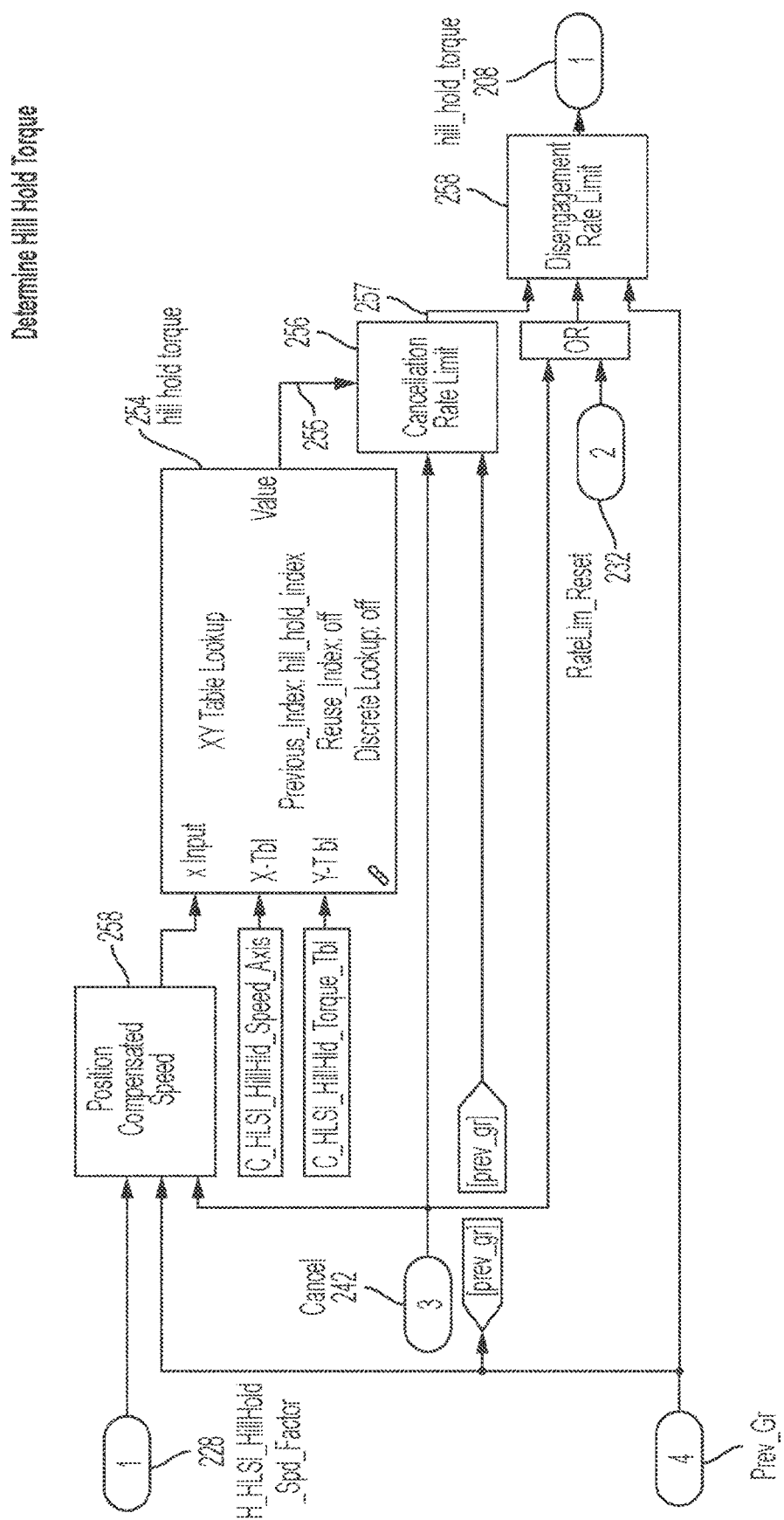

FIG. 8 depicts logic that calculates the hill hold torque and outputs HHT 208 signal based on a position compensated speed 258 (see FIG. 9) attenuated by speed factor 228. A speed vs. torque map is provided to a table lookup 254. The attenuated position compensation speed determines torque in the lookup table. The lookup table can be determined empirically. For example, a table can be provided, a vehicle driven, and the effect of the HHT sensed by occupants of the vehicle which may indicate whether the response is too aggressive or could be more aggressive. The lookup table is then updated. Different lookup tables can be determined and used for different vehicle types, mass, roadway slope etc. The output of the table is a HHT 255

If HHT cancel signal 242 is true, cancellation rate limit logic 256 (see FIG. 13) is applied to HHT 255 to arrive at a cancellation rate limited HHT 257. Disengagement rate limit logic 258 (see FIG. 14) can also be applied, to HHT 255 or 257, to generate HHT 208.

HHT is scheduled as a function of combined motor position and speed. This is roughly the equivalent of lead-compensated position (the faster the rollback, the lower the position before opposing torque is applied). The position gain determines the relative contributions of the two components. Also, the speed component carries an attenuation factor based on recent brake pedal activity. Lack of braking or movement will produce a speed factor of 1.0. Current active braking will product a speed factor of 0.0.

Figure 9:
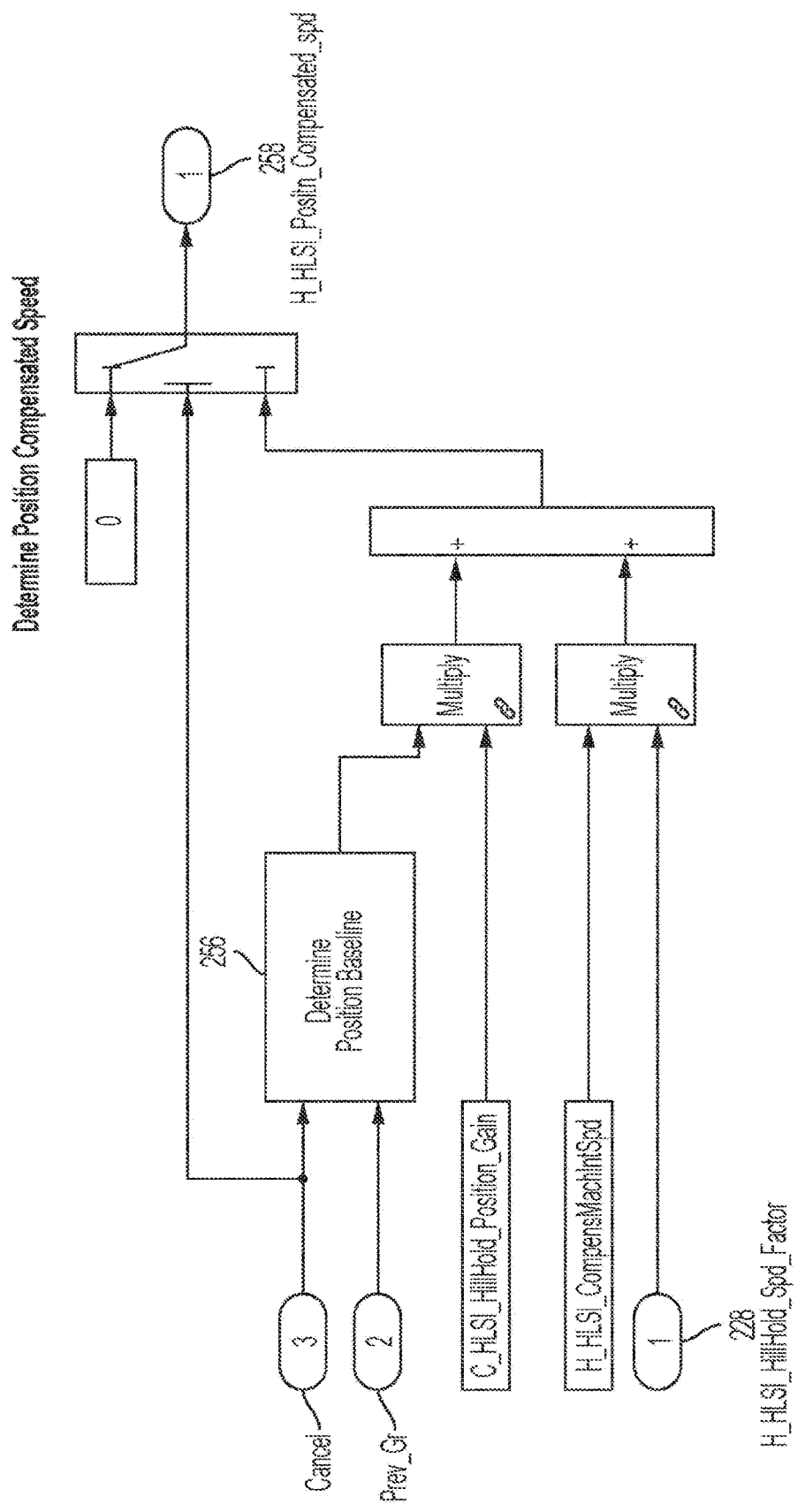

FIG. 9 depicts position compensated speed logic that determines a position compensated speed 258 based on a position baseline 256 (see FIG. 10) and a speed of the vehicle. Position baseline 256 is multiplied by a gain factor to calibrate or scale the value. The vehicle's speed is attenuated by multiplication by speed factor 228. The products of the calibrated position baseline and attenuated speed are added and the sum is output as position compensated speed 258, unless HHT cancel 242 signal is true, in which case position compensated speed 258 is set to zero.

Figure 10:
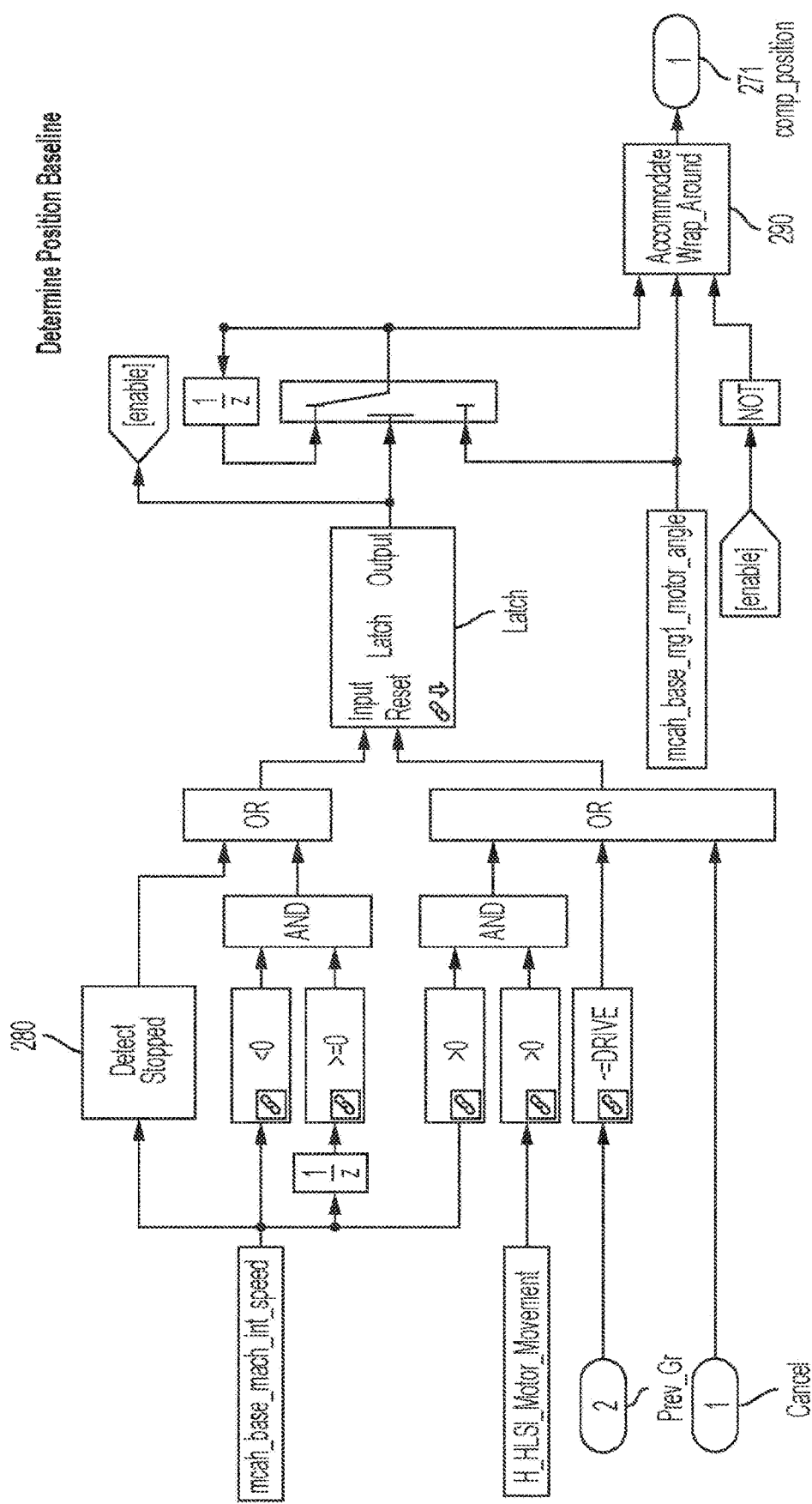
Figure 11:
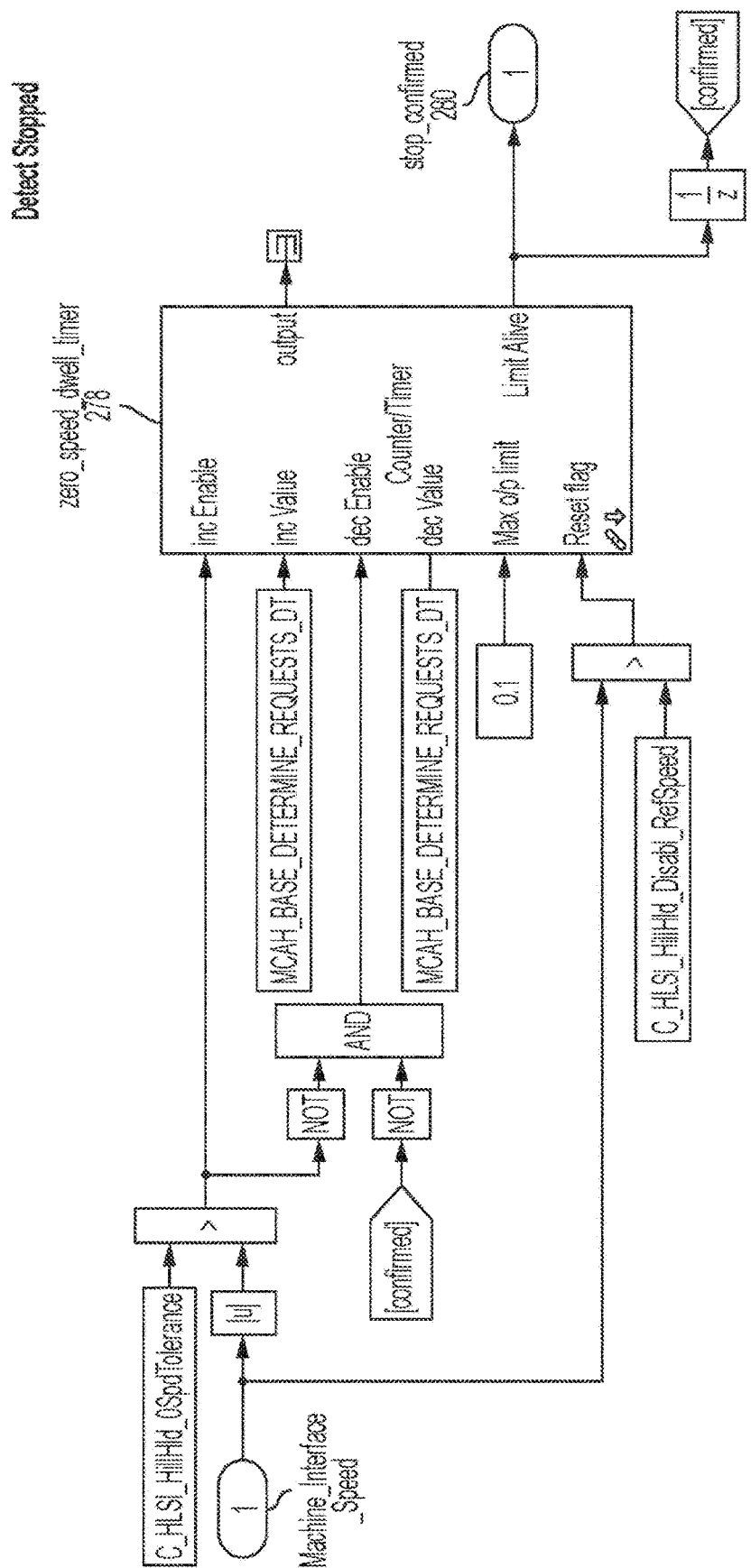

FIG. 10 depicts position baseline logic that determines a position baseline 270 based on movement of the vehicle and vehicle stopped, or stop confirmed, parameter 280 (see FIG. 11). The position baseline is determined when the vehicle stopped. Roll-back is measured from the position baseline. In the present embodiment position is measured based on motor angle, for example by counting gear teeth. The position baseline logic includes a latch that latches when 1) vehicle stopped parameter 280 is true, or 2) the motor speed is negative and the previous speed was positive. The latch is reset if 1) motor movement and speed is sensed or the gear is shifted so that the vehicle is no longer on direct drive, or HHT cancel 242 is true. A logic switch is connected to the latch output.

While the latch is set, the switch output is the previous value, which is the value of the motor angle captured when the vehicle stopped and motor speed transitioned from positive to negative. While the latch is reset, the switch output is the current value of the motor angle. In other words, the position baseline is constantly changing until the latch is set, at which time the position is captured and maintained until the latch is reset.

Figure 12:
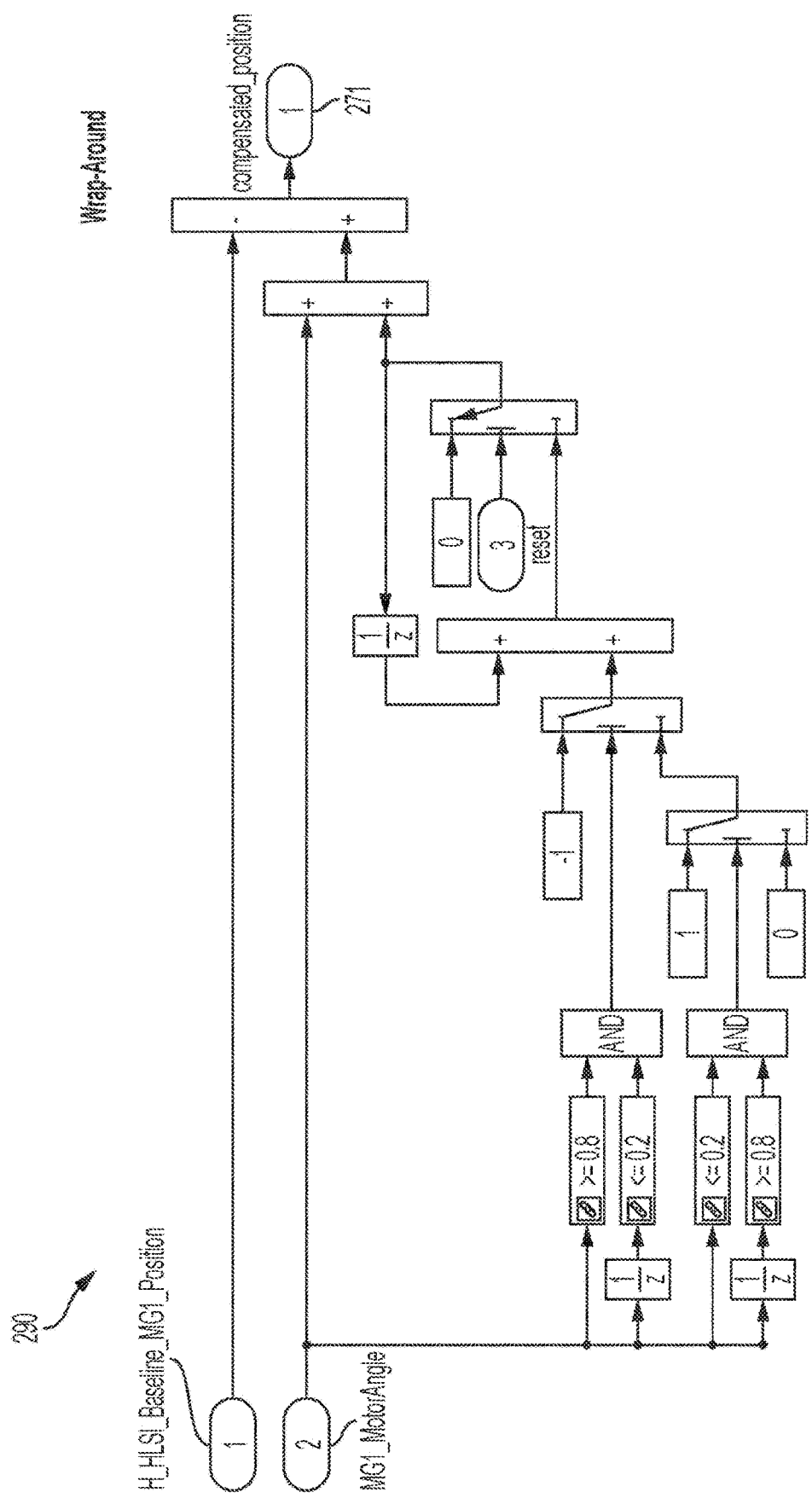

Because the position baseline is determined from the motor angle, which transitions from 360 digress to 0 degrees each revolution, wrap-around logic 290 is utilized to convert the angle to position (see FIG. 12). Wrap-around logic is not necessary if the position baseline is tracked by other means.

FIG. 11 depicts detect stopped logic that determines a stop confirmed parameter 280 based on a dwell timer 278 provided to avoid adding another calibration. A 100 msec timer is used to determine that speed is at or near zero. The tolerance on speed is calibratable because motor speed may oscillate on a stop even if the wheels do not seem to move. The counter counts up when speed is at or near zero and counts down when speed is not at or near zero and a stop has not yet been confirmed. The counter is reset only whence speed is in the predetermined range wherein rollback is of concern. The speed is at or near zero when a zero speed tolerance parameter exceeds the vehicle's speed. Dwell timer 278 counts up until it reaches its limit, e.g. 0.1 seconds, at which time stop confirmed parameter 280 becomes true.

FIG. 12 depicts wrap-around logic 290 that determines a compensated position parameter 271 based on the angular position of the motor. Motor angle is measured in units of revolutions and only defined for a single revolution. To un-wrap the broadcast numbers to prevent discontinuities, the wrap-around logic checks for abrupt changes between values near 1 and maintains a revolution counter. For very low speeds, it should be possible to only need to count a small number of revolutions. The wrap-around logic looks for increasing or decreasing wrap-around by comparing the motor angle to a prior value. For example, if the angle is less than 0.2 and the prior angle is greater than 0.8, then increasing wrap-around is determined, and an increasing wrap-around switch output is set to 1. If the angle is greater than 0.8 and the prior angle is less than 0.2, then decreasing wrap-around is determined, and a decreasing wrap-around switch output is set to −1. If wrap-around is not decreasing, the decreasing wrap-around switch output is set to the output of the increasing wrap-around switch output, which is set to 1 if wrap-around is increasing or 0 if it is not. Thus, each time the gear completes a revolution (the angle ranging between [0,1]) in a positive direction a 1 is added and each time the gear completes a revolution in a negative direction a −1 is added, generating compensated position parameter 271. Because motor position is only critical for anti-rollback capability, limit bookkeeping of wrap-around to lower speeds where it is relevant. The rest of the time, reset the revolution counter to zero. If anti-rollback is never enabled or is canceled, then the baseline position will track the actual position and the un-wrapping logic will be reset to zero. Therefore, the compensated position will go to zero and HHT will be zero.

The rollback control limits the rate at which the hill hold torque returns to zero. This is intended to mitigate the possibility of applied torque contributing to driveline oscillations by disrupting any sinusoidal oscillations with a rate limit of one side. Output is unlimited on increases (input>output).

Figure 13:
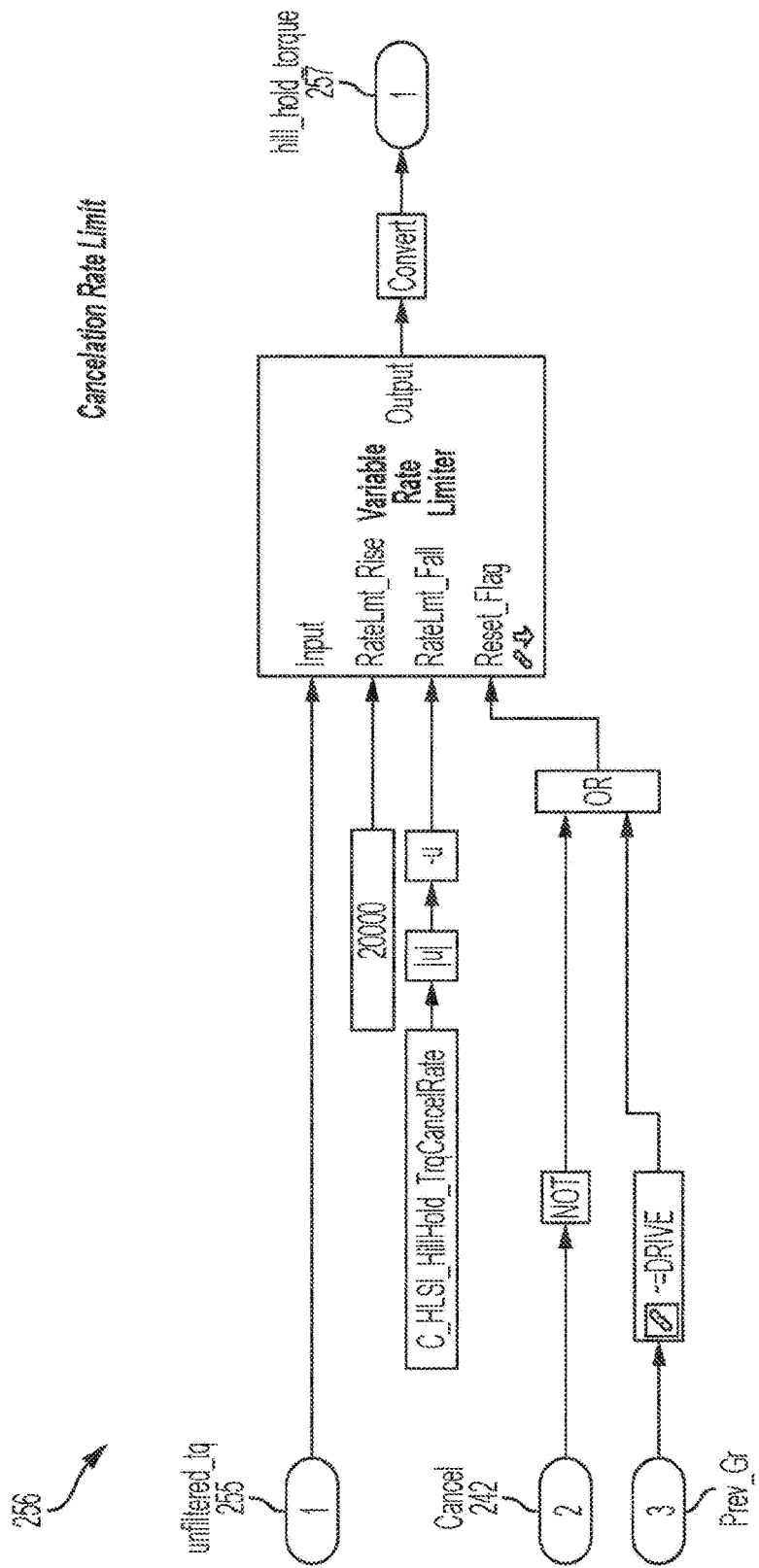

FIG. 13 depicts HHT cancelation rate limit logic 256 that limits the rate at which HHT returns to zero when HHT is canceled. The rate limit can be faster than the normal torque rate limit and is intended to smoothly transition HHT to zero from the value at the time HHT cancel 242 became positive. A rate limit timer is used to limit the torque. The decrease input of the timer is set by a torque cancel rate parameter. Logic is added to ensure that the input receives a negative value. The output of the timer follows torque until the torque decreases faster than the torque cancel rate parameter, at which time the output is the value of the torque cancel rate parameter. Analogously, if torque increases, the output of the timer follows torque until the torque increases faster than a rate equal to 20,000, which in practical terms imposes no limit.

Figure 14:
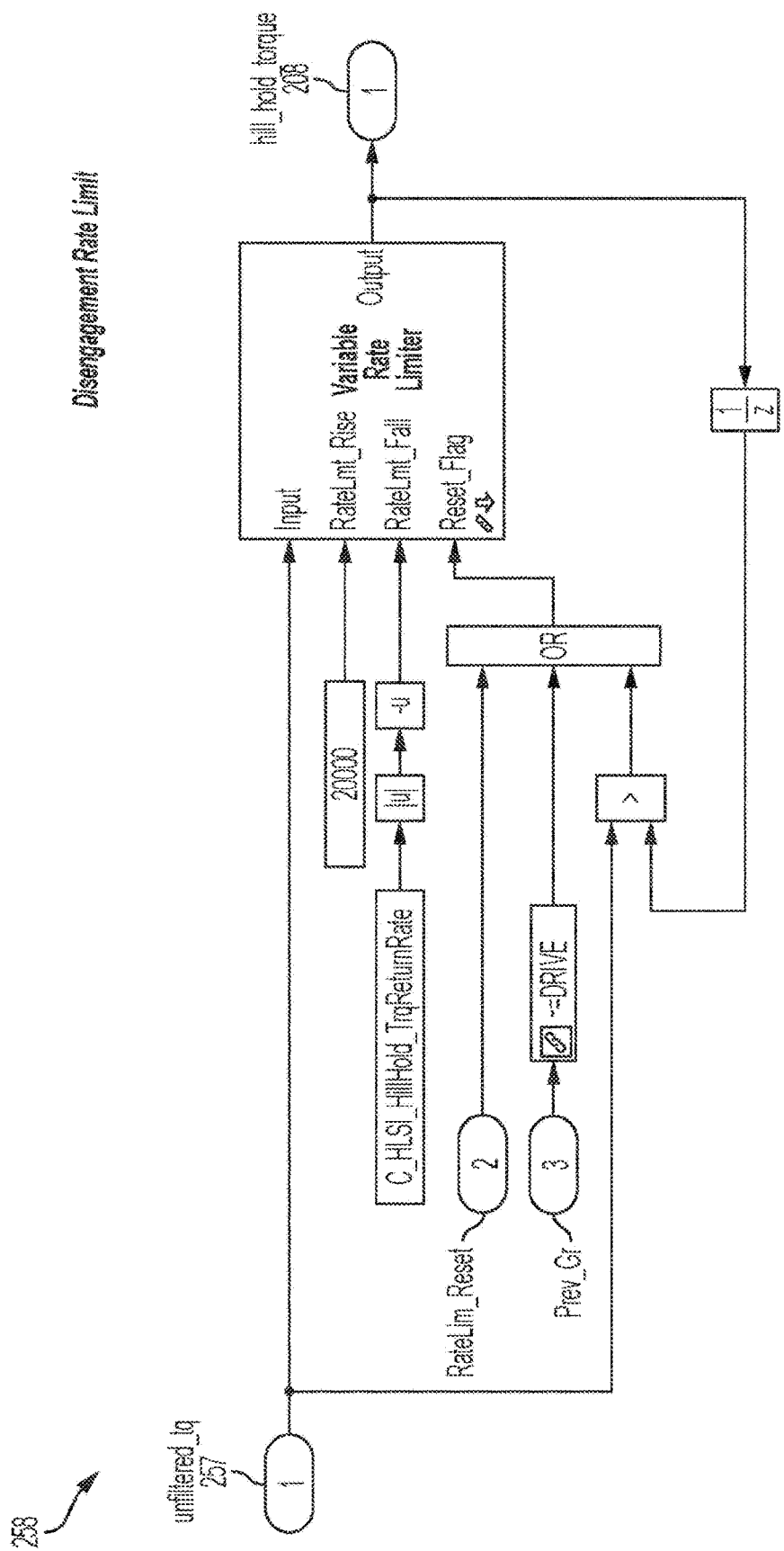

FIG. 14 depicts HHT disengagement rate limit logic 258 that limits the rate at which HHT returns to zero when HHT is disengaged but not canceled. The logic is the same as the HHT cancelation rate limit logic but the limit is set by a torque disengagement rate parameter instead of the torque cancelation rate parameter. The HHT disengagement rate limit logic is used to mitigate the possibility that HHT might, when disengaged, contribute to driveline oscillations.

Figure 15:
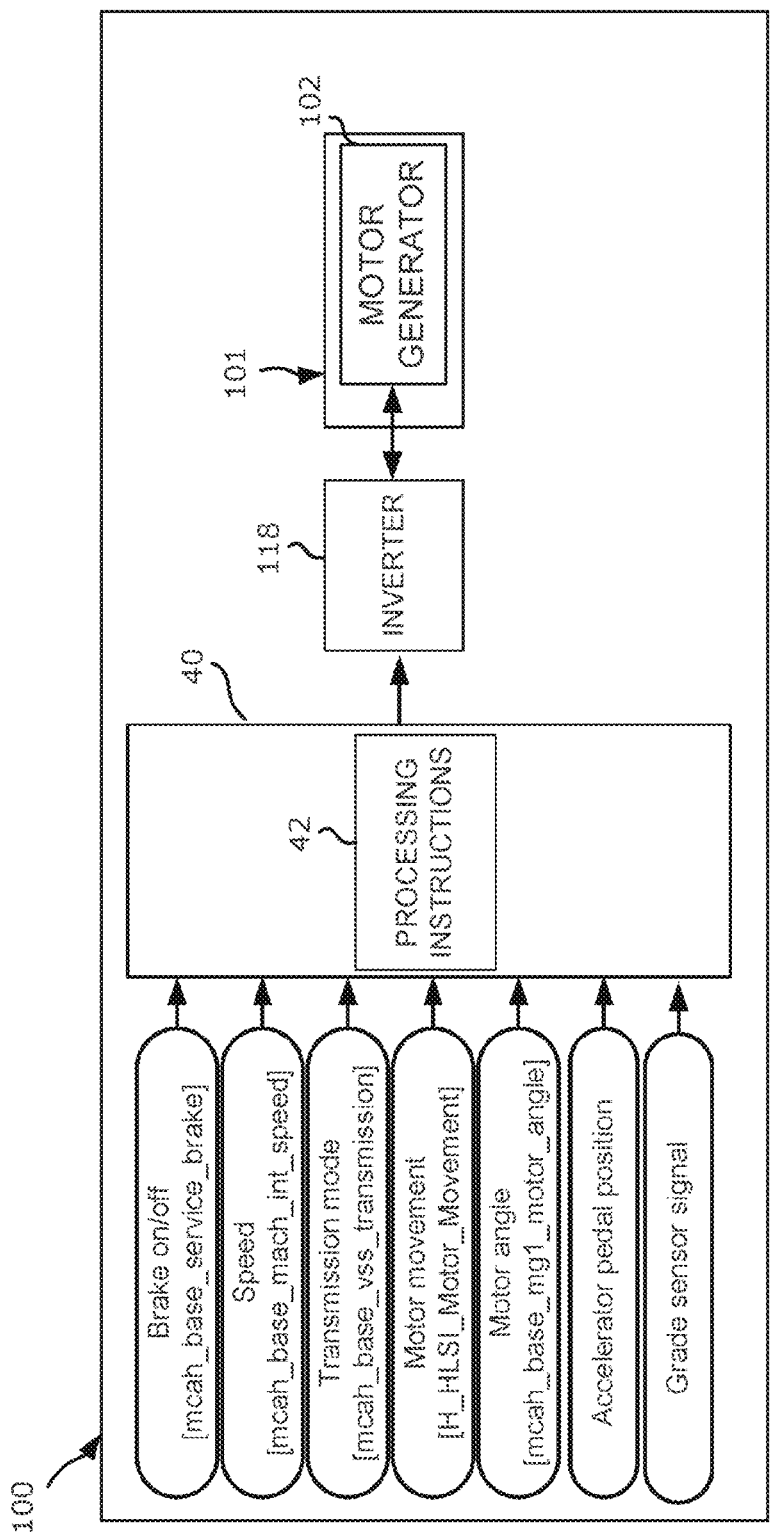
FIG. 15 is block diagram representation of an embodiment of a driveline controller in the electric vehicle of FIG. 1, operable to implement the rollback control method of FIGS. 4-14.

FIG. 15 depicts a block diagram of vehicle 100 with driveline 101 and motor-generator 102. As previously mentioned, driveline controller 40 has driveline logic, or processing instructions, 42 operable to process inputs from the various speed, transmission mode, grade, motor movement and angle, and brake sensors 44 in accord with the embodiments of the methods described above for controlling rollback. The processing instructions can be embedded in driveline controller 42 or can be embedded in memory accessible by driveline controller 42. Also shown is inverter 118. Torque commands generated by processing instructions 42 are used by inverter 42 to generate motor voltage to cause motor generator 102 to produce the commanded torque. Motor generator 102 and inverter 118 can also convert the vehicle's kinetic energy to electrical energy during braking (deceleration or rollback mitigation). The converted electrical energy is stored in energy storage devices such as batteries 20, ultracapacitors and ultrahigh-speed flywheels to extend the driving range of the vehicle. Thus, it is desirable to apply regenerative braking whenever possible. The vehicle also comprises a hydraulic or pneumatic braking system that works in conjunction with regenerative braking.

Maintaining the holding torque indefinitely may be of concern. For example, prolonged motor torque with no movement may cause the electric motor to overheat. A phase of the electric motor may become damaged and the motor may, thus, be derated and hinder drivability. Furthermore, it would be advantageous to remind drivers that the holding torque is not a brake, lest they treat it that way and exit the driver's seat without taking more permanent safeguards, such as applying a manual brake.

One option to maintaining the holding torque indefinitely (so long as the conditions merit it) is to maintain the holding torque for a fixed period and then releasing it. This solution has some potential drawbacks. For example, complete release of the holding torque will result in uncontrolled rollback, which could be problematic in crowded areas. Partial or gradual release of the holding torque may have a similar effect, only on a slower timescale.

In some embodiments, the hold torque is maintained for a predetermined time and then released. The release can be managed in the same way as the cancelation of the hold torque, as previously discussed, including reduction of the hold torque to zero torque and applying limits on the rate of hold torque reduction to provide a smooth transition. The release includes resetting of control variables that are controlled by the hold torque algorithms described with reference to FIGS. 4-14. After the release, the process to apply the hold torque may be repeated, by detecting rollback and generating a new hold torque based on the characteristics sensed during the detection of rollback after the release.

Figure 16:
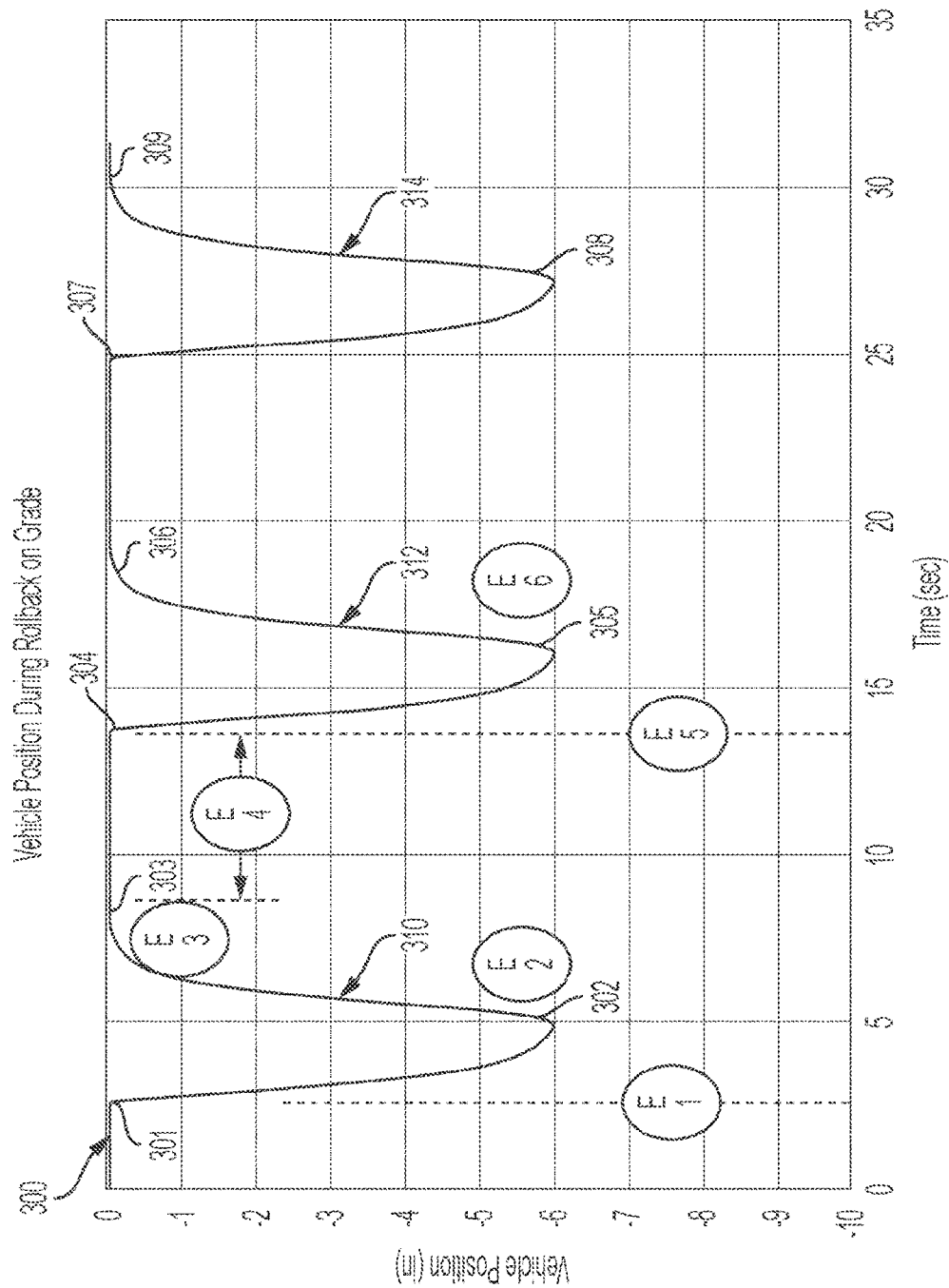
FIGS. 16 and 17 are graphs of position and torque vs. time of an electric vehicle implementing a variation of the embodiment of the rollback method described with reference to FIGS. 4-14.

FIG. 16 is a graph depicting a vehicle's position over time. Events E1-E6 are shown on curve 300 to illustrate the hold torque effect during a first application, or cycle 310, of the hold torque. Second and third hold torque cycles 312 and 314 are also shown, in this embodiment being equal to first cycle 310 with a constant predetermined hold duration therebetween. The first event (E1), at 2.5 seconds, corresponds to the start of rollback of a vehicle from a first position 301, characterized by negative vehicle position. The second event (E2), at 5.0 seconds, indicates the effect of application of the hold torque, countering the backward motion at a second position 302 and reversing the rollback distance by returning the vehicle to a third position 303, at E3. The fourth event (E4) indicates the predetermined duration of the hold torque after the vehicle moves to the third position 303 with subsequent release at event five (E5) from fourth position 304, which allows the vehicle to roll back to a fifth position 305. The sixth event, E6, corresponds to the re-application of the hold torque to move the vehicle to a sixth position 306, at which time the process repeats and at a seventh position 307 the hold torque is released. At an eighth position 308 the hold torque is reapplied and the vehicle moves to a ninth position 309.

In the foregoing description positions 302, 305, and 308 are the same. In a variation of the present embodiment described below, positions 302, 305, and 308 are not the same. In that variation, positions 303, 306, and 309 are also not the same.

In the foregoing description positions 303 and 304, and 306 and 307, are the same, indicating that the hold torque during the predetermined time is constant. In a variation of the present embodiment, the vehicle is allowed to move slightly from position 303 to position 304, by allowing a small amount of rollback and potentially changing the powered phase of the motors, and the vehicle is allowed to move slightly from position 306 to position 307.

Figure 17:
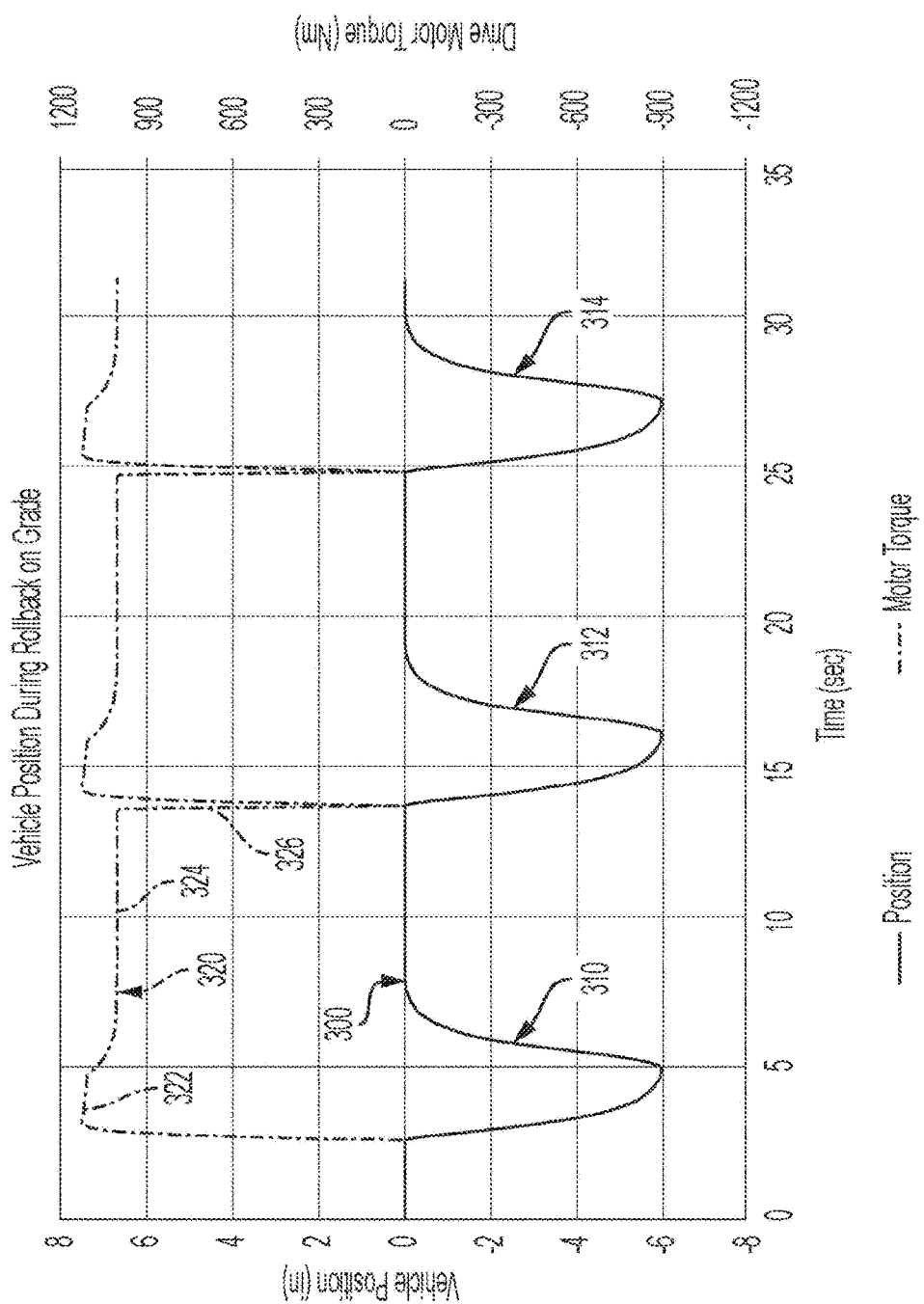

FIG. 17 is a graph depicting the vehicle's position over time, shown as curve 300 as in FIG. 16, and additionally showing a curve 320 depicting the amount of hold torque required to hold the vehicle and achieve the vehicle's positions depicted by curve 300. At 322 the hold torque reaches a maximum which reflects the energy required to stop the vehicle. At 324 the hold torque is reduced from the maximum but is sufficient to maintain the vehicle in a stationary position. Then, at 326, the hold torque is releases, which allows rollback of the vehicle.

Although the graph depicted in FIG. 16 illustrates events E3 and E4, it is also possible to trigger the release of the hold torque from event E2 and to apply the hold torque for a predetermined time from E2.

It is also possible that the predetermined time vary between cycles. The predetermined time may vary based on the amount of hold torque initially applied at E2 or at E3. For example, the predetermined time may be decreased or increased.

Additionally, it is not necessary to apply the same amount of hold torque each time. The amount of hold torque for the second cycle, after the first release, may be adjusted based on the data obtained during the application of the first hold torque. Thus, it may be desirable to apply the hold torque required to stop the vehicle sooner to reduce the amount of torque needed to stop the vehicle, which would reduce heat generation in the motors. The amount of hold torque to maintain a stationary position will be the same since the mass and grade will not change. The same effect may be achieved by beginning the application of the hold torque based on the first cycle, without waiting to measure position or acceleration, since the mass, slope, and reaction of the vehicle will be the same. Application of the hold torque sooner than the previous cycle would also have the effect that the vehicle will rollback less than the previous cycle, which may result in a different phase of the monitor being engaged to hold the vehicle, thus distributing heat generation to different phases at different cycles. How much sooner and how much roll-back to allow to achieve this effect can be determined and mapped experientially or calculated based on the gear ratios of the drivetrain of the vehicle and the construction of the motor. In essence, inches of wheel rotation are correlated to degrees of rotation of the motor, which can be correlated to the position of the motor's poles, to thus correlate wheel motion to pole position.

Furthermore, the vehicle may be permitted to creep after maintaining the stationary position. Rather than maintain the stationary position for the predetermined time, during the predetermined time the position may be allowed to change more gradually than if the hold torque were removed. The amount of creep may be designed to allow transition from one pole of the motor to another to thus distribute heat generation.

Figure 18:
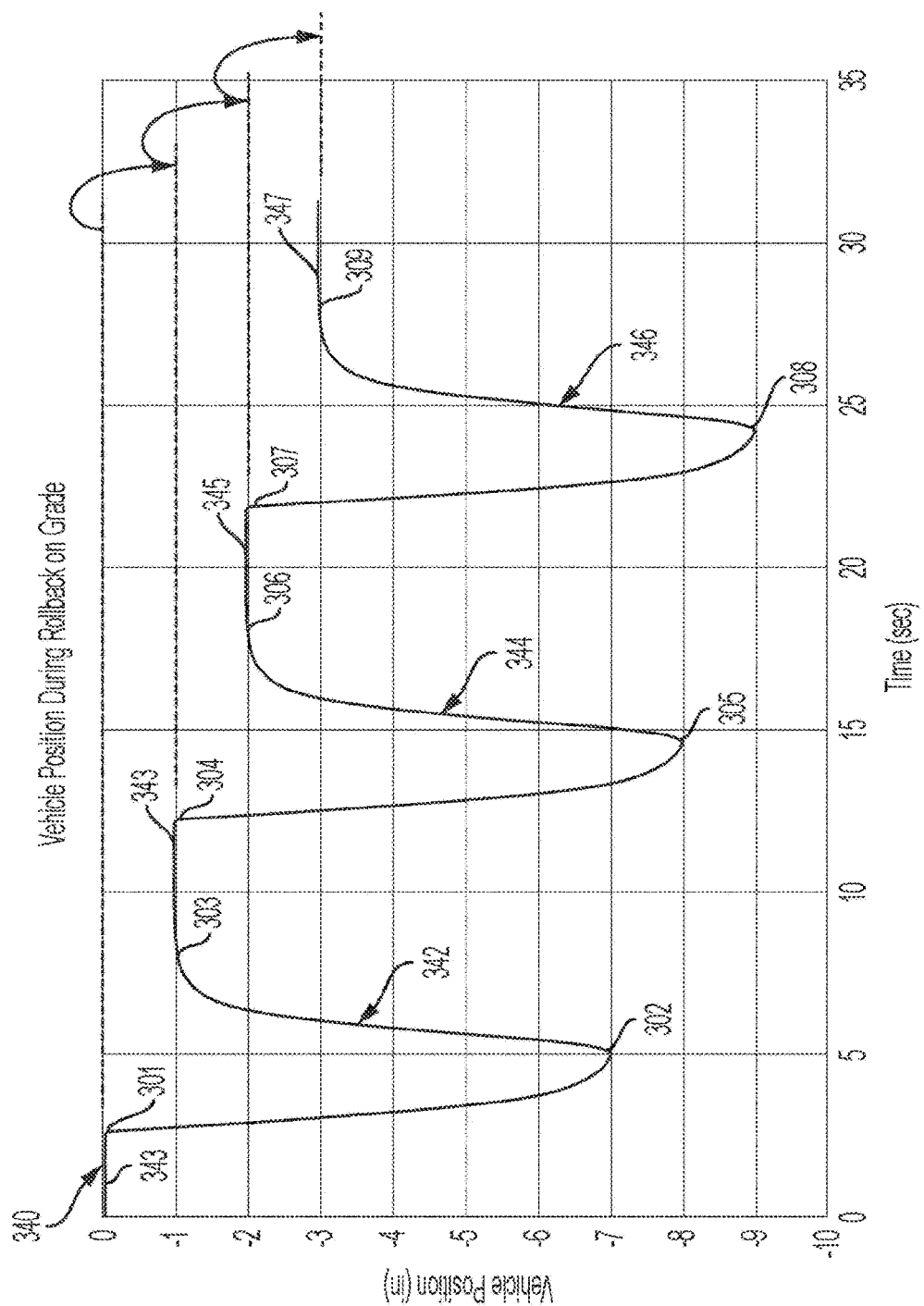
FIG. 18 is a graphs of position vs. time of an electric vehicle implementing another variation of the embodiment of the rollback method described with reference to FIGS. 4-14.

As described, if there is concern of motor heating due to repeatedly returning to the same stationary position, it would be possible to change (increment/decrement) the initial position at the end of each rollback cycle/event (e.g. 304, 306, 309). Position increments can be positive (always moves slightly forward on each event) or negative (always falls slightly short of returning to original position on each event). FIG. 18 is a graph depicting a curve 340 showing a vehicle's position over time including three hold cycles 342, 344, and 346, and three hold positions 343, 345, and 347 that decrement from the initial position. The hold positions illustrate a reduction in the hold torque relative to that shown in FIGS. 16 and 17, to bring the vehicle to a stop before reaching an initial position 341. Hold position 343 is an inch less than position 341, hold position 345 is an inch less than hold position 343, and hold position 347 is an inch less than hold position 345. Change in hold position should result in a different motor phase being powered for holding torque once stationary. The position change of one inch may seem small, but given tire size and driveline gear ratios, it could amount to amplified rotation of the drive motor (typically one inch may be 10° or more rotation of the drive motor).

As described, vehicle rollback is constrained while the vehicle is allowed to roll back countless times. Advantageously, the movement is constrained to back and forth over the same limited space, and there is not sustained operation with stationary motor providing significant torque. Torque is sustained for no more than a set number of seconds. After that, torque is released and motor windings are allowed to cool off.

The driver is given no indication of permanence. With limited rollback permitted at a fixed but fairly short repeating interval, the operator will never be lulled into mistaking the anti-rollback holding force for a more permanent operating mode.

The embodiments, figures, and examples suggest intended forward motion, with rollback being "backward movement", for ease of explanation. The directions are relative to the intended direction of movement. If the vehicle is in the DRIVE mode, the intended direction is forward and rollback implies backward movement. On the other hand, if the vehicle is in the REVERSE mode, and is stopped on a downhill grade, all the concepts described herein are applicable, with rollback implying forward movement. In other words, rollback implies a movement direction opposite to the intended movement of the vehicle.

Torque cancelling and then re-enabling as described with reference to rollback can be applied to other situations, such as vehicle low-speed creep logic where the applied creep torque is sufficient to hold against gravity on a grade, but is insufficient to propel the vehicle forward. The creep torque can, analogously, be disabled and re-enabled for a predetermined time.

Many aspects of this disclosure are described in terms of sequences of actions to be performed by a controller or other hardware capable of executing programmed instructions. These elements can be embodied in a controller of a driveline system, such as a driveline control module or unit (DCM or DCU), or in a controller separate from, and communicating with an DCM/DCU. In an embodiment, the driveline controller and/or DCM/DCU can be part of a controller area network (CAN) in which the controller, sensor, actuators communicate via digital CAN messages. It will be recognized that in each of the embodiments, the various actions for implementing the control strategy could be performed by specialized circuits (e.g., discrete logic gates interconnected to perform a specialized function), by program instructions, such as program modules, being executed by one or more processors (e.g., a central processing unit (CPU) or microprocessor), or by a combination of both, all of which can be implemented in a hardware and/or non-transient computer readable instructions of the ECM/ECU and/or other controller or plural controllers. Logic of embodiments consistent with the disclosure can be implemented with any type of appropriate hardware and/or non-transient computer readable instructions, with portions residing in the form of computer readable storage medium with a control algorithm recorded thereon such as the executable logic and instructions disclosed herein, and can be programmed, for example, to include one or more singular or multidimensional lookup tables and/or calibration parameters. Thus, the term "logic" as used herein includes software and/or firmware comprising processing instructions executing on one or more programmable processors, application-specific integrated circuits, field-programmable gate arrays, digital signal processors, hardwired logic, or combinations thereof, which may referred to as "controllers". A non-transitory machine-readable medium comprising logic can additionally be considered to be embodied within any tangible form of a computer-readable carrier, such as solid-state memory, containing an appropriate set of computer instructions and data structures that would cause a processor to carry out the techniques described herein. The computer readable medium can comprise a random access memory (RAM), a read-only memory (ROM), an erasable programmable read-only memory (EPROM or Flash memory), an optical fiber, and a portable compact disc read-only memory (CD-ROM), or any other solid-state, magnetic, and/or optical disk medium capable of storing information. Thus, various aspects can be embodied in many different forms, and all such forms are contemplated to be consistent with this disclosure.

In certain embodiments, driveline controller 40 forms a portion of a processing subsystem including one or more computing devices having memory, processing, and communication hardware. Driveline controller 40 and its functionality may be implemented in any known manner. For example, driveline controller 40 may be a single device or a distributed device, and the functions of the controller may be performed by hardware and/or as computer instructions on a non-transient computer readable storage medium.

In certain embodiments, driveline controller 40 includes one or more modules that functionally execute the operations of the controller. The description herein including modules emphasizes the structural independence of certain aspects of controller 40, and illustrates one grouping of operations and responsibilities of the controller. Other groupings that execute similar overall operations are understood within the scope of the present application. Modules may be implemented in hardware and/or as computer instructions on a non-transient computer readable storage medium, and modules may be distributed across various hardware or computer based components.

Example and non-limiting module implementation elements include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

As used herein, the transitional term "comprising", which is synonymous with "including," or "containing," is inclusive or open-ended and does not exclude additional, unspecified elements or method steps. By contrast, the transitional term "consisting" is a closed term which does not permit addition of unspecified terms.

While this disclosure has been described as having exemplary designs, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

We claim:

1. A method of reducing rollback of an electric vehicle, the method comprising:
    determining a position baseline of the electric vehicle, the position baseline comprises a first position of the electric vehicle;
    determining a position compensated speed of the electric vehicle based on the position baseline;
    determining a hold torque as a function of the position compensated speed;
    generating a command to apply the hold torque with a motor-generator of the electric vehicle; and
    permitting the electric vehicle to roll to a second position, stopping the roll at the second position with the hold torque, and continuing to apply the hold torque to counter the roll until the vehicle stops at a third position;
wherein the third position equals the first position.

2. The method of claim 1, wherein determining a position baseline comprises determining a stopped condition of the electric vehicle or a speed polarity transition, and wherein the position baseline is a position of the electric vehicle at a time when the stopped condition or the speed polarity transition were determined; and
wherein determining a stopped condition of the electric vehicle comprises determining that a speed of the electric vehicle is less than or equal to an absolute zero speed tolerance for a zero speed dwell time.

3. The method of claim 1, wherein determining a position compensated speed of the electric vehicle comprises adding a position baseline component and an attenuated speed component, wherein the attenuated speed component comprises a product of a speed of the electric vehicle and a speed factor; and
wherein the hold torque is based on a product of the position compensated speed and the speed factor.

4. The method of claim 3, wherein the speed factor comprises a normalized dwell time based on a brake release event or a speed of the electric vehicle being less than an absolute zero speed tolerance; and
wherein at least one of:
the speed factor ranges between 0 and 1;
the normalized dwell time comprises a ratio of dwell time based on the brake release event or the speed of the electric vehicle bring less than the absolute zero speed tolerance; and
the speed factor decreases if the speed is greater than the absolute zero speed tolerance or if the brakes are reapplied.

5. The method of claim 1, further comprising disengaging the hold torque if a speed of the electric vehicle exceeds a cancellation speed; and
wherein disengaging the hold torque comprises reducing the hold torque to zero and rate limiting a rate at which the hold torque is reduced to zero.

6. The method of claim 1, further comprising at least one of:
determining a slope of the electric vehicle, wherein the hold torque function further includes a slope gain corresponding to the slope;
determining a mass of the electric vehicle, wherein the hold torque function further includes a mass gain corresponding to the mass;
determining a slope and a mass of the electric vehicle, wherein the hold torque function further includes a mass gain corresponding to the mass and a slope gain corresponding to the slope; and
determining a grade, and determining a mass of the electric vehicle based on the grade, wherein the hold torque function further includes a mass component based on the mass.

7. A driveline controller for electric vehicle including a motor-generator operable to drive a wheel of the electric vehicle, the driveline controller comprising processing instructions which when executed implement a method comprising:
determining a position baseline of the electric vehicle, wherein the position baseline comprises a first position of the electric vehicle;
determining a position compensated speed of the electric vehicle based on the position baseline;
determining a hold torque as a function of the position compensated speed;
generating a command to apply the hold torque with a motor-generator of the electric vehicle;
wherein the position baseline is based on a stopped condition of the electric vehicle or a speed polarity transition and a position of the electric vehicle at a time when the stopped condition or the speed polarity transition were determined; and
permitting the electric vehicle to roll to a second position, stopping the roll at the second position with the hold torque, and continuing to apply the hold torque to counter the roll until the vehicle stops at a third position;
wherein the third position equals the first position.

8. The driveline controller of claim 7, wherein the position baseline comprises a first position of the electric vehicle, the method further comprising permitting the electric vehicle to roll to a second position, stopping the roll at the second position with the hold torque, and continuing to apply the hold torque to counter the roll until the vehicle stops at a third position.

9. The driveline controller of claim 8, wherein the third position is different from the first position.

10. The driveline controller of claim 8, wherein the third position equals the first position.

11. The driveline controller of claim 8, wherein the hold torque varies between the first position and the third position.

12. The driveline controller of claim 8, wherein the processing instructions are configured to apply the hold torque for a predetermined time, wherein the electric vehicle is at the third position at a start of the predetermined time and at a fourth position at an end of the predetermined time.

13. The driveline controller of claim 12, wherein the predetermined time varies between rollback cycles.

14. The driveline controller of claim 12, wherein the third position equals the fourth position.

15. The driveline controller of claim 12, wherein the third position is different than the fourth position.

16. An electric vehicle comprising:
a wheel supporting a frame;
a motor-generator operable to drive the wheel; and
a driveline controller as in claim 7.

17. The electric vehicle of claim 16, further comprising a sensor communicatively coupled with the driveline controller and operable to sense movement of the electric vehicle.

18. The electric vehicle of claim 16, further comprising a brake pedal and a brake sensor communicatively coupled with the driveline controller and operable to determine pressure applied to the brake pedal.

19. The electric vehicle of claim 16, wherein the hold torque varies between the first position and the third position.

20. The electric vehicle of claim 16, wherein processing instructions are configured to apply the hold torque for a predetermined time, wherein the electric vehicle is at the third position at a start of the predetermined time and at a fourth position at an end of the predetermined time;
wherein the predetermined time varies between rollback cycles.

* * * * *